(12) United States Patent
Smith et al.

(10) Patent No.: US 11,697,497 B2
(45) Date of Patent: Jul. 11, 2023

(54) AERIAL VEHICLES HAVING COUNTERMEASURES DEPLOYED FROM A PLATFORM FOR NEUTRALIZING TARGET AERIAL VEHICLES

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 851 days.

(21) Appl. No.: 16/151,316

(22) Filed: Oct. 3, 2018

(65) Prior Publication Data

US 2020/0108926 A1 Apr. 9, 2020

(51) Int. Cl.
*B64C 39/02* (2023.01)
*B64F 1/00* (2006.01)
(Continued)

(52) U.S. Cl.
CPC ............ *B64C 39/024* (2013.01); *B64F 1/007* (2013.01); *F41H 11/02* (2013.01); *G05D 1/101* (2013.01);
(Continued)

(58) Field of Classification Search
CPC ............. B64C 39/024; B64C 2201/12; B64C 2201/141; B64C 2201/182;
(Continued)

(56) References Cited

U.S. PATENT DOCUMENTS 4,240,601 A 12/1980 Reed
6,119,976 A 9/2000 Rogers
(Continued)

FOREIGN PATENT DOCUMENTS

CN 107792381 A 3/2018
DE 102015003323 A1 9/2016
(Continued)

OTHER PUBLICATIONS

International Search Report for International Application No. PCT/US2019/054537 dated Jul. 16, 2020, 22 pages.
(Continued)

*Primary Examiner* — Valentina Xavier

(57) ABSTRACT

A system for aerial neutralization of a detected target aerial vehicle comprises a plurality of counter-attack unmanned aerial vehicles (UAVs), and an aerial vehicle capture countermeasure coupling together the plurality of counter-attack UAVs, to intercept and capture a detected target aerial vehicle in a coordinated manner. The system comprises an aerial vehicle detection system comprising at least one detection sensor operable to detect the target aerial vehicle, and operable to provide command data to at least one counter-attack UAV for tracking and neutralizing the target aerial vehicle. The counter-attack UAVs and a net can be deployed from a movable base station, and the net can be carried in a low-drag configuration until the counter-attack UAVs operate to deploy or open the net. The counter-attack UAVs and systems may be autonomously operated. Associated systems and methods are provided.

37 Claims, 10 Drawing Sheets

(51) Int. Cl.
  *F41H 11/02* (2006.01)
  *G05D 1/10* (2006.01)
  *G05D 1/12* (2006.01)
  *B64U 70/30* (2023.01)
  *B64U 101/00* (2023.01)

(52) U.S. Cl.
  CPC ............ *G05D 1/12* (2013.01); *B64U 70/30* (2023.01); *B64U 2101/00* (2023.01); *B64U 2201/10* (2023.01)

(58) Field of Classification Search
  CPC .... B64C 2201/121; B64F 1/007; F41H 11/02; G05D 1/101; G05D 1/12
  See application file for complete search history.

(56) References Cited

U.S. PATENT DOCUMENTS

| | | | |
|---|---|---|---|
| 6,392,213 | B1 | 5/2002 | Martorana et al. |
| 8,146,855 | B2 | 4/2012 | Ismailov |
| 9,085,362 | B1 | 7/2015 | Kilian et al. |
| 9,789,950 | B1 | 10/2017 | Most et al. |
| 10,040,554 | B1 | 8/2018 | Weinstein et al. |
| 10,364,026 | B1 | 7/2019 | Hanlon et al. |
| 10,384,772 | B2 | 8/2019 | Yamada et al. |
| 10,663,266 | B2 * | 5/2020 | Banga ................ F42B 10/56 |
| 10,689,109 | B2 | 6/2020 | Wypyszynski et al. |
| 10,926,875 | B2 | 2/2021 | Klein |
| 2009/0114761 | A1 | 5/2009 | Sells, II |
| 2009/0212157 | A1 | 8/2009 | Arlton et al. |
| 2010/0181424 | A1 | 7/2010 | Goossen et al. |
| 2012/0216697 | A1 | 8/2012 | Jacobsen et al. |
| 2012/0252485 | A1 | 10/2012 | Wolverton et al. |
| 2014/0183300 | A1 * | 7/2014 | MacCulloch ......... B64C 39/024 244/1 TD |
| 2015/0360797 | A1 | 12/2015 | Melish et al. |
| 2016/0023760 | A1 | 1/2016 | Goodrich |
| 2016/0117932 | A1 | 4/2016 | Park et al. |
| 2016/0250535 | A1 | 9/2016 | Yatsko |
| 2016/0251088 | A1 | 9/2016 | Melish et al. |
| 2016/0293015 | A1 | 10/2016 | Bragin |
| 2016/0376029 | A1 | 12/2016 | Sekiya |
| 2017/0057635 | A1 | 3/2017 | Strayer |
| 2017/0059692 | A1 | 3/2017 | Laufer et al. |
| 2017/0144756 | A1 * | 5/2017 | Rastgaar Aagaah ........ G05D 1/0094 |
| 2017/0205820 | A1 * | 7/2017 | Liu ........................ A63C 5/03 |
| 2017/0225784 | A1 * | 8/2017 | Hayes ...................... B64D 5/00 |
| 2017/0253348 | A1 | 9/2017 | Ashdown et al. |
| 2017/0261292 | A1 | 9/2017 | Armstrong et al. |
| 2017/0261604 | A1 | 9/2017 | Van Voorst |
| 2017/0291704 | A1 * | 10/2017 | Alegria ................ G05D 1/0866 |
| 2017/0355461 | A1 | 12/2017 | Naito et al. |
| 2017/0356726 | A1 * | 12/2017 | Theiss ................ B64C 39/024 |
| 2017/0369169 | A1 | 12/2017 | Lee et al. |
| 2018/0162528 | A1 | 6/2018 | McGrew et al. |
| 2018/0162529 | A1 | 6/2018 | Klein |
| 2018/0162530 | A1 | 6/2018 | Klein |
| 2018/0164080 | A1 | 6/2018 | Chi-Hsueh |
| 2018/0197420 | A1 | 7/2018 | Banga |
| 2018/0224262 | A1 | 8/2018 | Klein |
| 2018/0237161 | A1 * | 8/2018 | Minnick ................ B60L 53/14 |
| 2018/0244401 | A1 | 8/2018 | Kilian et al. |
| 2018/0257780 | A1 * | 9/2018 | Sassinsky ................ B64F 1/02 |
| 2018/0335779 | A1 * | 11/2018 | Fisher .................. B64C 39/024 |
| 2019/0025858 | A1 * | 1/2019 | Bar-Nahum ........... B64D 47/08 |
| 2019/0063881 | A1 | 2/2019 | Abramov et al. |
| 2019/0068953 | A1 * | 2/2019 | Choi ..................... G01B 11/25 |
| 2019/0100315 | A1 | 4/2019 | Theiss |
| 2019/0112045 | A1 | 4/2019 | Zhang |
| 2019/0129427 | A1 | 5/2019 | Sugaki et al. |
| 2019/0176684 | A1 | 6/2019 | Zych |
| 2019/0176986 | A1 | 6/2019 | Addonisio et al. |
| 2019/0346241 | A1 | 11/2019 | Metz et al. |
| 2020/0108922 | A1 | 4/2020 | Smith et al. |
| 2020/0108923 | A1 * | 4/2020 | Smith ................ G05D 1/0094 |
| 2020/0108924 | A1 * | 4/2020 | Smith ................ F41H 13/0043 |
| 2020/0108925 | A1 * | 4/2020 | Smith ..................... B64D 5/00 |
| 2021/0188435 | A1 | 6/2021 | Smith et al. |

FOREIGN PATENT DOCUMENTS

| | | |
|---|---|---|
| FR | 2965908 A1 | 4/2012 |
| JP | 2007-223491 A | 9/2007 |
| JP | 2019-060589 A | 4/2019 |
| KR | 10-2015-0145786 | 12/2015 |
| KR | 10-2016-0071027 A | 6/2016 |
| KR | 10-2017-0079782 | 7/2017 |
| KR | 10-1830880 B1 | 2/2018 |
| KR | 10-2020-0042307 A | 4/2020 |
| KR | 2021-0066872 A | 6/2021 |
| WO | WO 2016/193722 A1 | 12/2016 |
| WO | WO 2018/016017 A1 | 1/2018 |
| WO | WO 2018/112281 A1 | 6/2018 |

OTHER PUBLICATIONS

International Search Report for International Application No. PCT/US2019/054545 dated Jul. 24, 2020, 24 pages.
International Search Report for International Application No. PCT/US2019/054547 dated Jul. 24, 2020, 23 pages.
International Search Report for International Application No. PCT/US2019/054552 dated Jan. 13, 2020, 20 pages.
International Search Report for International Application No. PCT/US2019/054541 dated Jan. 14, 2020, 18 pages.
Airspace Systems Inc.; "Airspace LV"; Vimeo [online] [video]; vimeo.com; (Apr. 5, 2017); 2 pages; [retrieved on Oct. 2, 2018]; Retrieved from <URL: https://vimeo.com/211704482?from=outroembed >.
Airspace Systems, Inc.; "Airspace"; airspace.co; (2016); 4 pages; [retrieved on Oct. 2, 2018]; Retrieved from <URL: http://airspace.co/#technology >.
Atherton; "This Drone Fires Nets to Catch Other Drones"; Popular Science; (Apr. 5, 2016); [retrieved on Oct. 2, 2018]; Retrieved from <URL: https://www.popsci.com/drone-fires-nets-to-catch-other-drones >.
Dedrone; "Dedrone Videos"; dedrone.com; (2018); 3 pages; [retrieved on Oct. 2, 2018]; Retrieved from <URL: https://www.dedrone.com/products/videos >.
Fortem Technologies; "Fortem DroneHunter™ Demonstration"; YouTube [online] [video]; YouTube.com; (Sep. 24, 2017); 1 page; [retrieved on Oct. 2, 2018]; Retrieved from <URL: https://www.youtube.com/embed/BsFXLPFzK-4 >.
Groupe Assmann; "Drone Interception"; YouTube [online] [video]; YouTube.com; (Dec. 12, 2014); 2 pages; [retrieved on Oct. 2, 2018]; Retrieved from <URL: https://youtu.be/APWG3VEGbJw >.
Moseman; "This Drone Interceptor Captures Your Pathetic Puny Drone With a Net"; Popular Mechanics; (Feb. 11, 2015); 6 pages; [retrieved on Oct. 2, 2018]; Retrieved from <URL: http://www.popularmechanics.com/flight/drones/a14032/france-dispatches-a-net-carrying-bully-drone-to-catch/ >.
Openworks Engineering Ltd.; "SkyWall"; Openworks Engineering; [brochure]; (2017); 15 pages; <URL: https://openworksengineering.com/skywall >.
Starrs; "To Catch a Drone, Use a Net"; The Washington Post (WP Company LLC); (Jan. 15, 2016); 3 pages; [retrieved on Oct. 2, 2018]; Retrieved from <URL: https://www.washingtonpost.com/news/morning-mix/wp/2016/01/15/watch-a-drone-catcher-net-a-rogue-drone/?utm_term=.63257596ca17 >.

* cited by examiner

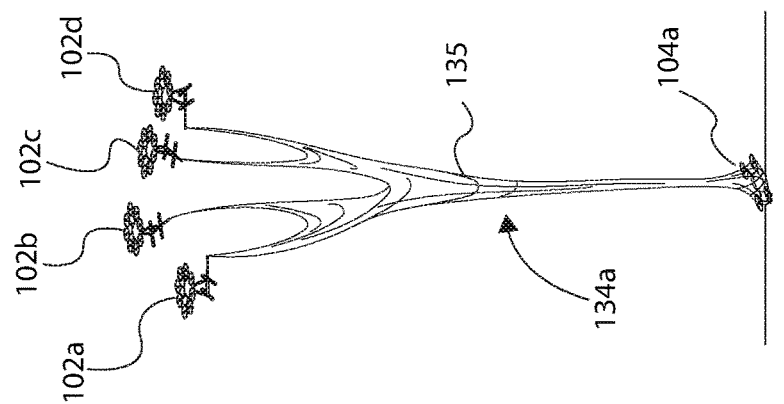
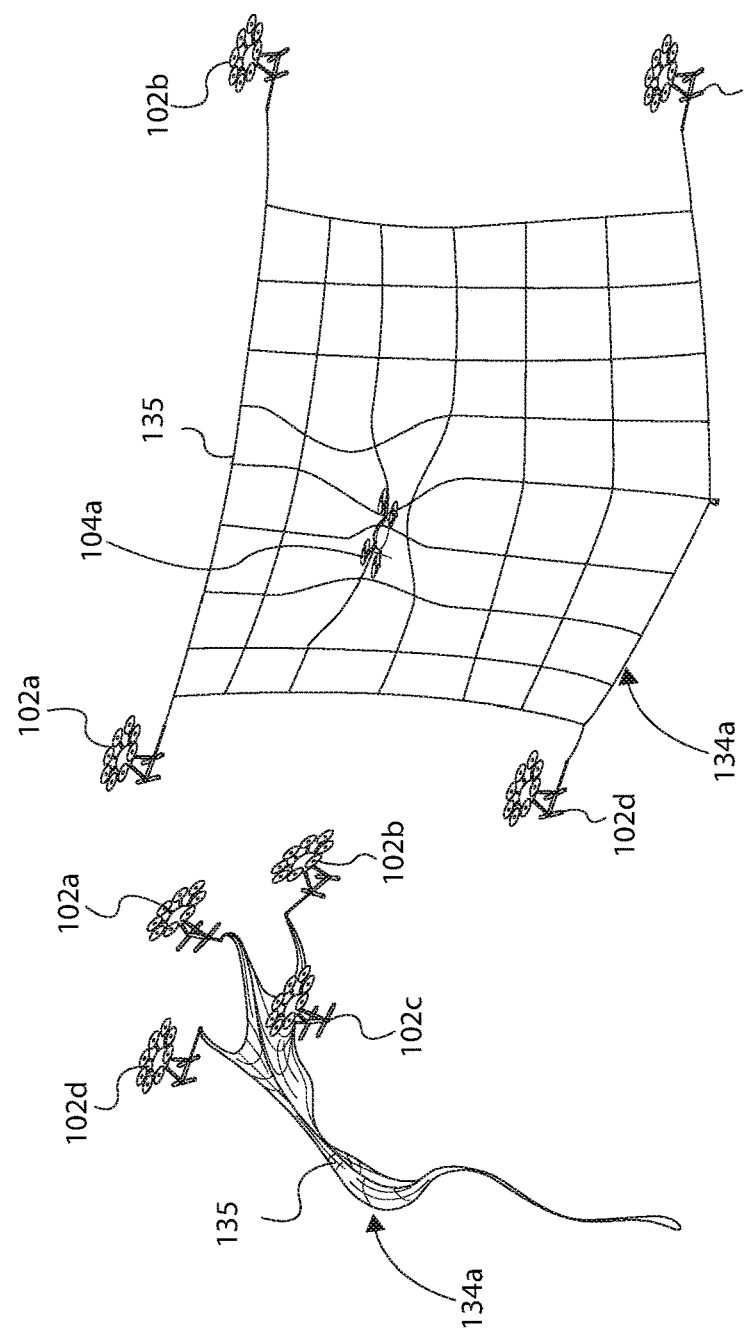
FIG. 6F
FIG. 6E
FIG. 6D

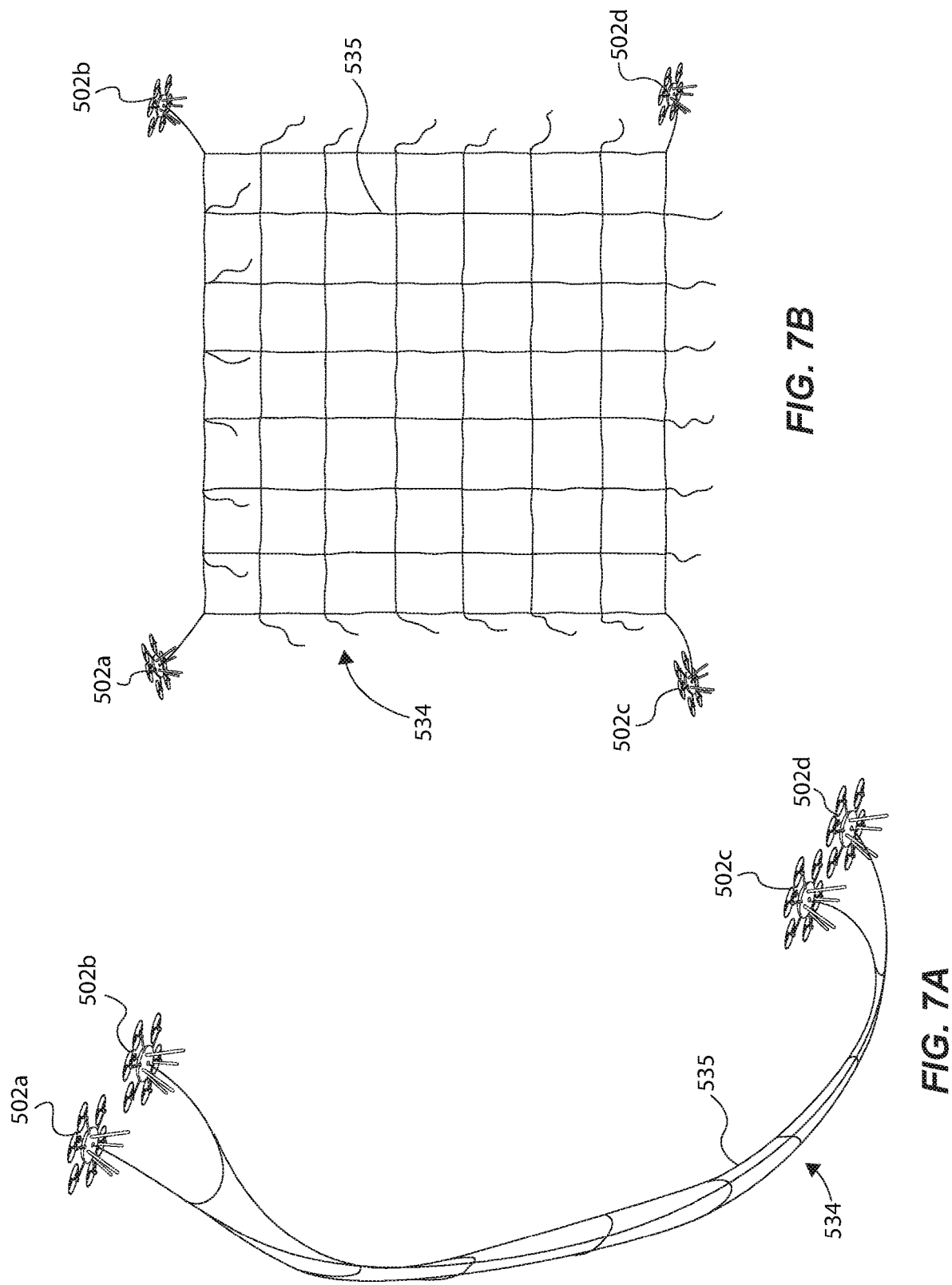

AERIAL VEHICLES HAVING COUNTERMEASURES DEPLOYED FROM A PLATFORM FOR NEUTRALIZING TARGET AERIAL VEHICLES

BACKGROUND

Unmanned aerial vehicles (UAVs), such as multi-rotor drones, fixed-wing drones, and tilt rotor drones, have become increasingly popular in the past decade. This popularity, coupled with their constantly improving performance capabilities, pose threats in terms of collisions with other aerial vehicles or structures, whether accidental or deliberate. More serious threats are also becoming more of a realization and possibility, such as terrorist attacks on high-value targets, such as government complexes, international airports, nuclear or other power plants, petrochemical facilities, water reservoirs, sporting events, and other highly-populated or critical infrastructure or locations. Factors that contribute to such threats are the high rate of speed of drones, their small signature, the possibility of simultaneous, coordinated attacks from a number of attacking drones, their ability to carry increasingly large payloads, and others. These factors are exacerbated by the fact that drones are relatively inexpensive, easy to acquire, highly portable, and highly maneuverable. Moreover, consumer drones are dramatically improving in terms of endurance, range, and payload transport capabilities (e.g., some consumer drones can carry up to 50 lbs., with other more expensive and advanced drones being able to carry up to 400 pounds), which is enough to carry significant amounts of explosives, projectiles, biological and/or chemical weapons. In many cases, a drone operated for a deliberate attack can be launched and flown into a protected perimeter within just a few seconds, which leaves minimal time to detect and neutralize the attacking drone.

With all these considerations in mind, one or more inexpensive adversarial drones can be autonomously or manually flown into a protected area while potentially causing a large amount of damage and/or harm, all at a very low cost and effort by a programmer/operator. Counteracting such threats with existing technologies can be very costly and complex, particularly when trying to protect a relatively large airspace associated with hundreds of acres or square kilometers of a property.

BRIEF SUMMARY OF THE INVENTION

In one example, the present disclosure sets forth a system for aerial neutralization of a target aerial vehicle. The system can comprise a plurality of counter-attack UAVs that each comprises a flight control system operable to facilitate flight of the counter-attack UAV to intercept a detected target aerial vehicle. The system can comprise an aerial vehicle capture countermeasure coupling together the plurality of counter-attack UAVs. The plurality of counter-attack UAVs can be operable in a coordinated manner to capture the target aerial vehicle with the aerial vehicle capture countermeasure, thereby neutralizing the target aerial vehicle.

In one example, the system can comprise an external aerial vehicle detection system comprising at least one detection sensor operable to detect the target aerial vehicle, and operable to provide command data, which can include location data, to at least one of the plurality of counter-attack UAVs to facilitate interception of the target aerial vehicle by the plurality of counter-attack UAVs.

In one example, the aerial vehicle capture countermeasure comprises at least one flexible entangling element (e.g., a net) configured to disrupt operation of the target aerial vehicle, for example, to at least one rotary propeller, in response to the counter-attack UAVs being in close proximity with the target aerial vehicle.

In one example, the aerial vehicle capture countermeasure comprises a net configurable in a low-drag transport position during flight of the plurality of counter-attack UAVs, and that is movable to a deployed capturing position in response to coordinated flight of the plurality of counter-attack UAVs to capture the target aerial vehicle in the net.

In one example, the present disclosure sets forth a system for detecting and neutralizing a target aerial vehicle. The system can comprise a counter-attack UAV comprising: a flight body; a flight control system supported about the flight body and operable to facilitate flight of the UAV; and an aerial vehicle capture countermeasure carried by the flight body. The system can comprise an aerial vehicle detection system comprising at least one detection sensor operable to detect a target aerial vehicle. The aerial vehicle detection system can be operable to provide command data to the counter-attack UAV to facilitate interception of the target aerial vehicle by the counter-attack UAV. In response to interception of the target aerial vehicle, the counter-attack UAV is operable to capture the detected target aerial vehicle with the aerial vehicle capture countermeasure, thereby neutralizing the target aerial vehicle.

In one example, the aerial vehicle detection system comprises an on-board aerial vehicle detection system comprising at least one sensor configured to detect a position of the target aerial vehicle. The flight control system can comprise a flight controller operable to control autonomous flight of the counter-attack UAV based on the detected position of the target aerial vehicle.

In one example, the aerial vehicle detection system can comprise an external aerial vehicle detection system comprising at least one detection sensor operable to detect the target aerial vehicle, and to provide command data to the counter-attack UAVs to facilitate interception of the target aerial vehicle by the counter-attack UAVs.

In one example, the external aerial vehicle detection system is associated with a ground-based structure to monitor an airspace, and the at least one detection sensor comprises a plurality of detection sensors configured to detect a plurality of target aerial vehicles.

In one example, the system comprises a base platform supporting the plurality of counter-attack UAVs when in a grounded position. The base platform comprises a retainer device supporting the aerial vehicle capture countermeasure when the plurality of counter-attack UAVs are in the grounded position. In response to detecting the target aerial vehicle, the plurality of counter-attack UAVs are operable to depart from the base platform, thereby withdrawing the aerial vehicle capture countermeasure from the retainer device.

In one example, the present disclosure sets for a method for aerial neutralization of a target aerial vehicle comprising: detecting a target aerial vehicle; operating a plurality of counter-attack UAVs to intercept the target aerial vehicle; and capturing the target aerial vehicle with an aerial vehicle capture countermeasure carried by the plurality of counter-attack UAVs, thereby neutralizing the target aerial vehicle.

In one example, the method comprises detecting the target aerial vehicle further comprises tracking a dynamic flight position with an aerial vehicle detection system.

In one example, the method comprises communicating position data between at least one other counter-attack UAV or an external aerial vehicle detection system to facilitate coordinated flight and coordinated neutralization of the target aerial vehicle.

In one example, the method comprises deploying the plurality of counter-attack UAVs from a base platform supporting the plurality of counter-attack UAVs when in a grounded position. The base platform can comprise a retainer device supporting the aerial vehicle capture countermeasure when the plurality of counter-attack UAVs are in the grounded position, such that the plurality of counter-attack UAVs withdraw the aerial vehicle capture countermeasure from the retainer device in response to deployment of the plurality of counter-attack UAVs.

In one example, the method comprises moving a base station to a predetermined location relative to a monitored airspace, and supporting the plurality of counter-attack UAVs about a platform of the base station, and bundling the aerial vehicle capture countermeasure about a retainer device of the base station.

In one example, the method comprises releasing the aerial vehicle countermeasure and the captured target aerial vehicle from the counter-attack UAVs at a particular location.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 6D illustrates the counter-attack UAVs of FIG. 6C, being in flight and carrying the aerial vehicle capture countermeasure in a stowed or folded position.

FIG. 6E illustrates the counter-attack UAVs of FIG. 6D, being in flight and maintaining the aerial vehicle capture countermeasure in a deployed position to capture a target aerial vehicle.

FIG. 6F illustrates the counter-attack UAVs of FIG. 6E, and ready to release the aerial vehicle capture countermeasure and the captured target aerial vehicle at a location.

FIG. 7A illustrates a plurality of counter-attack UAVs being in flight and carrying an aerial vehicle capture countermeasure in a stowed or folded position in accordance with another example of the present disclosure.

FIG. 7B illustrates the counter-attack UAVs of FIG. 7A, and that maintain the aerial vehicle capture countermeasure in a deployed position to capture a target aerial vehicle in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

To further describe the present technology, examples are now provided with reference to the figures.

Figure 1:
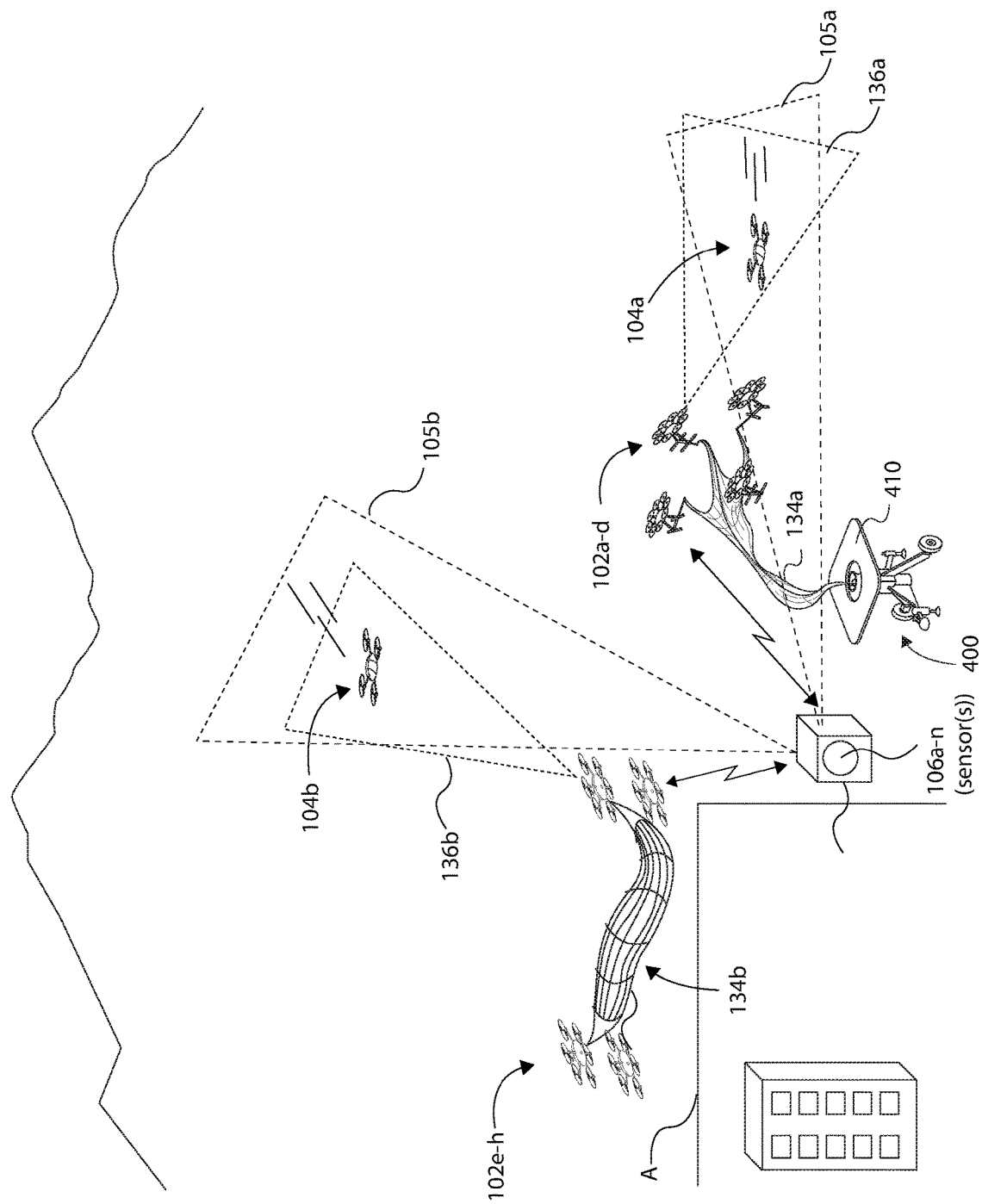
FIG. 1 is an illustration that graphically and schematically shows a system for detecting and neutralizing a target aerial vehicle with a counter-attack UAV in accordance with an example of the present disclosure.
Figure 2:
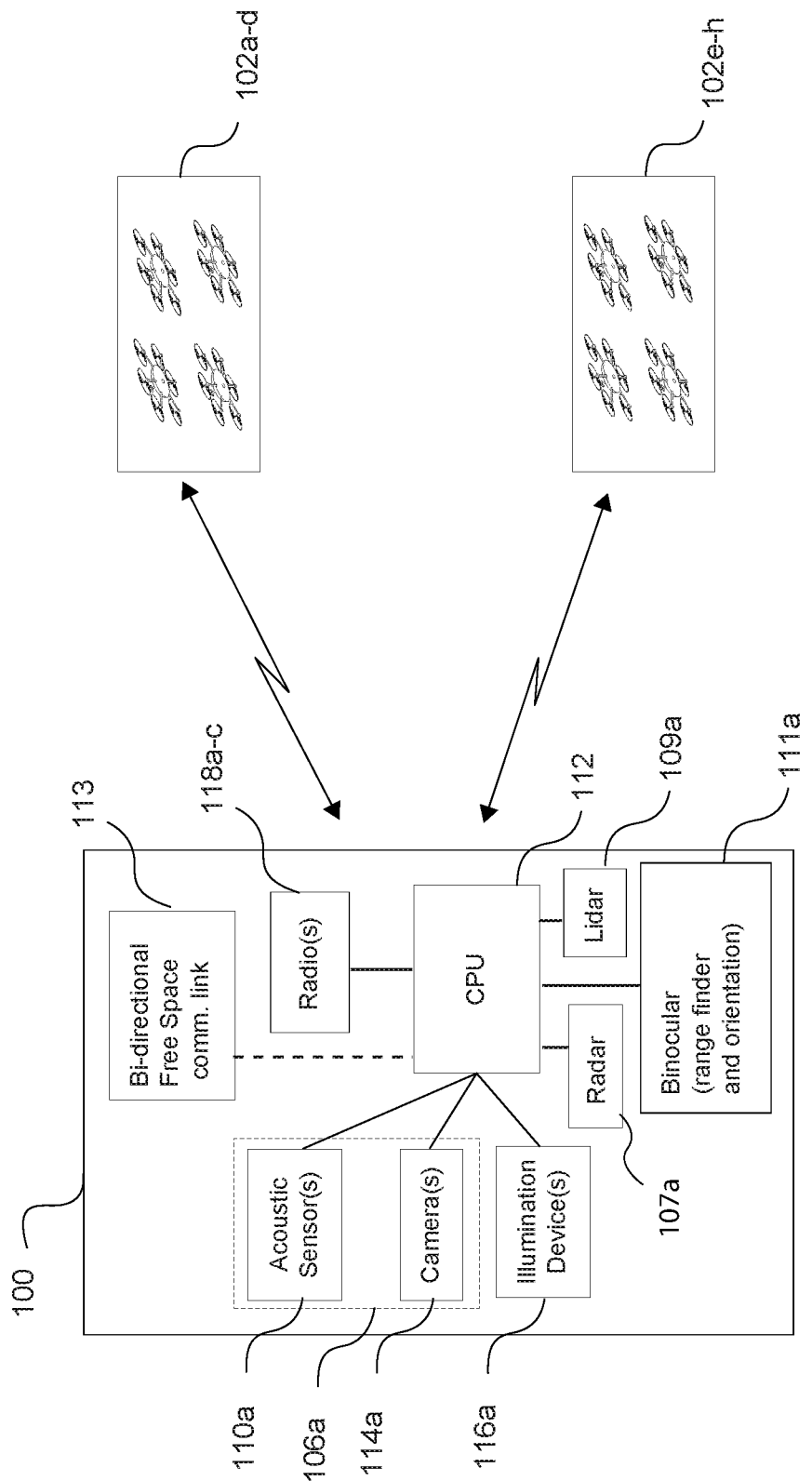
FIG. 2 is a block diagram that illustrates possible detection and communication aspects of the system of FIG. 1 in accordance with an example of the present disclosure.
Figure 3:
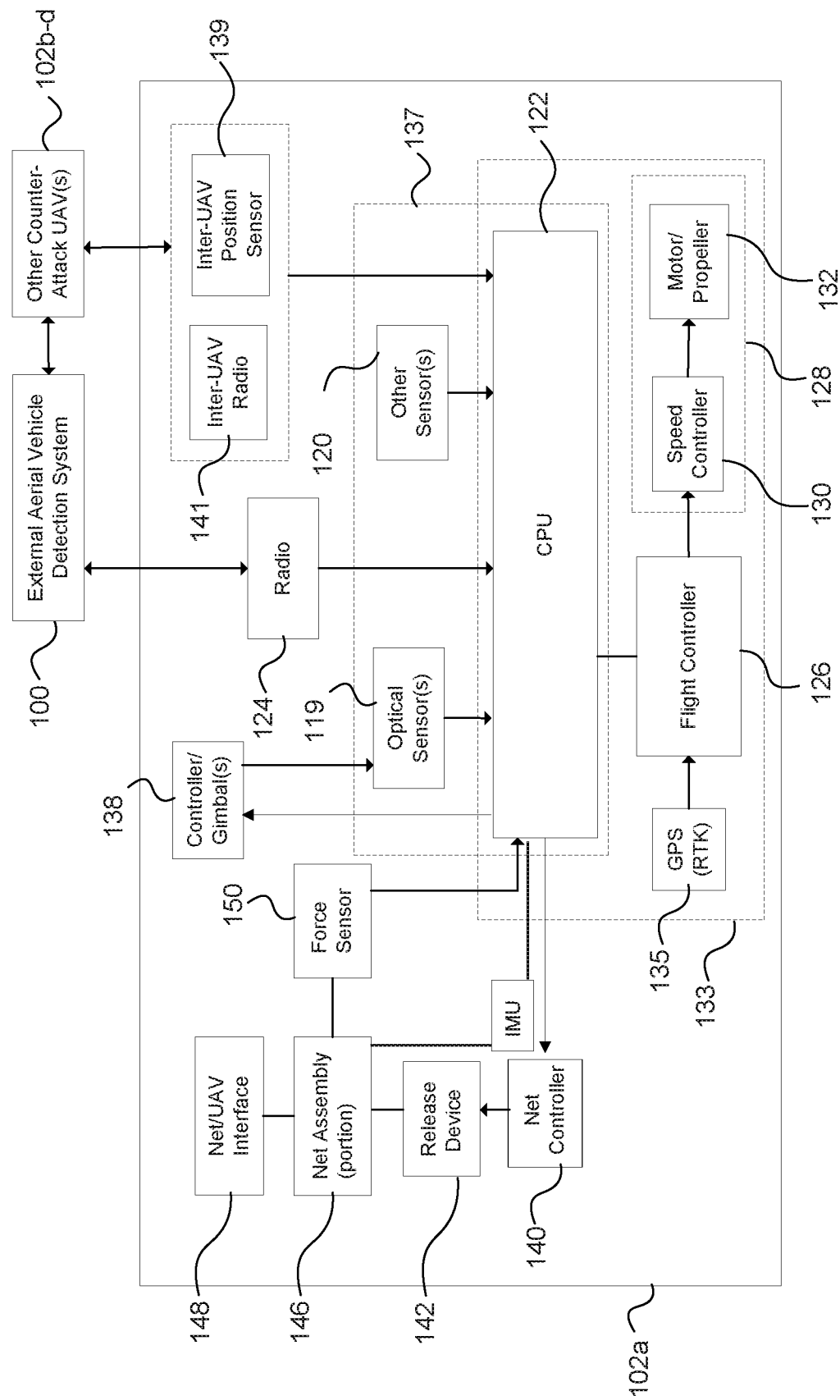
FIG. 3 is a block diagram that illustrates possible detection and operation aspects of a counter-attack UAV (e.g., such as in FIG. 1) in accordance with an example of the present disclosure.
Figure 4:
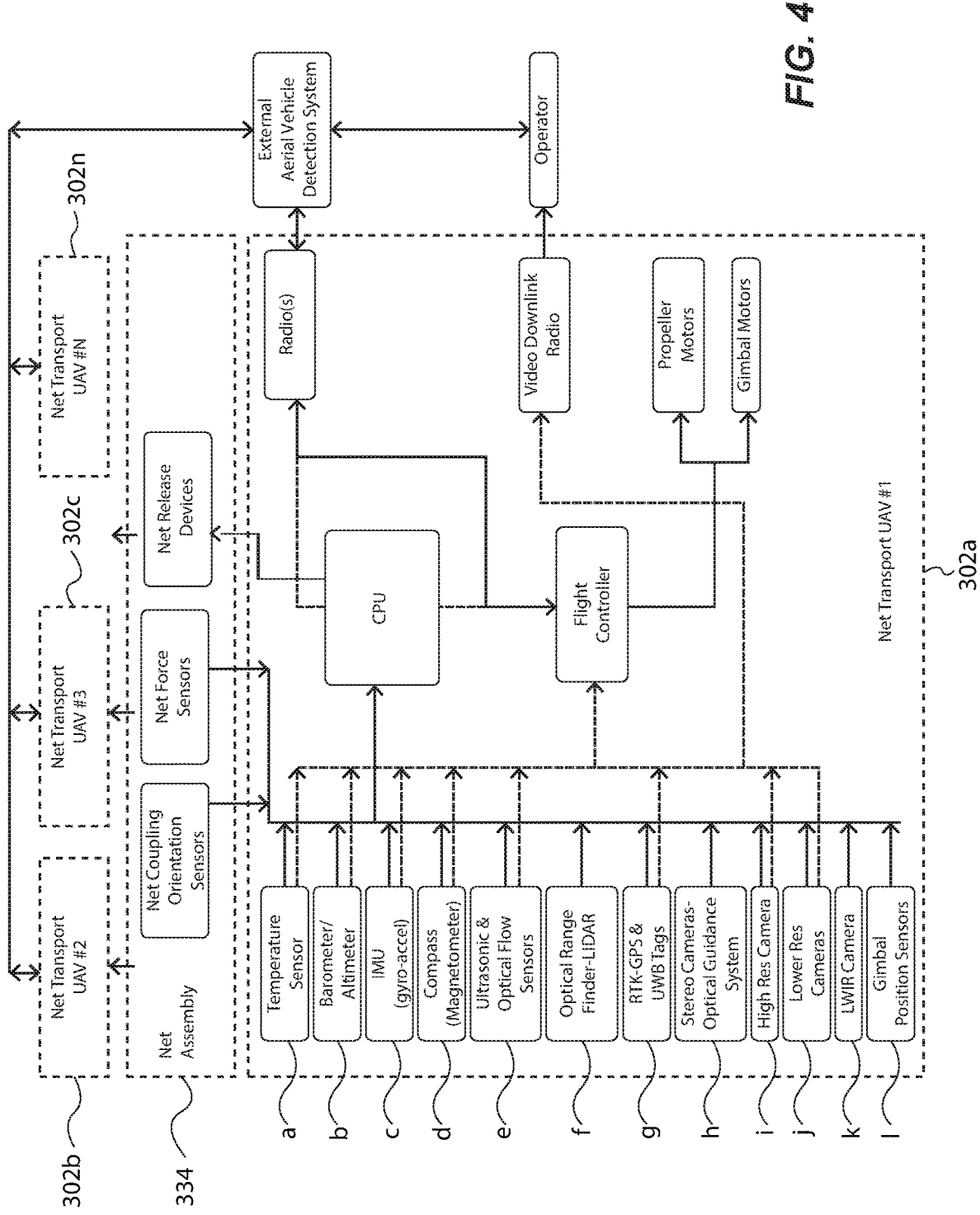
FIG. 4 is a block diagram that illustrates a system of a plurality of counter-attack UAVs supporting or carrying an aerial vehicle capture countermeasure in accordance with an example of the present disclosure.

FIG. 1 schematically and graphically illustrates a system and method for protecting an airspace area A with an external aerial vehicle detection system 100 and a plurality of counter-attack UAV(s), such as example UAVs 102*a-d* and 102*e-h*. The external aerial vehicle detection system 100 can be configured to communicate with the counter-attack UAV(s) 102*a-h* for the purpose of neutralizing one or more target aerial vehicle(s) (e.g., see target aerial vehicles 104*a* and 104b) that may be encroaching or approaching the airspace area A, and that are determined to be a threat to the airspace area A. FIG. 2 is a block diagram that illustrates the components of the external aerial vehicle detection system 100 and its ability to perform detecting and real-time tracking of the target aerial vehicle(s) 104a and/or 104b, and to communicate command data to the counter-attack UAV(s) 102a-h. The command data can include any data relevant to facilitate capture of the target UAV, including, but not limited to, data pertaining to the location of the target UAV. FIG. 3 is a block diagram that illustrates a control system of an individual counter-attack UAV (e.g., any of 102a-h) for neutralizing one or more of the target aerial vehicles 104a and 104b, and how the control system is operable with the external aerial vehicle detection system 100 and other counter attack UAVs 102. And finally, FIG. 4 illustrates a block diagram of a system of a particular counter-attack UAV (e.g., any one of 102a-h) for tracking a target aerial vehicle and for navigation of the counter-attack UAV, as coupled to one or more other counter-attack UAVs, by a particular aerial vehicle capture countermeasure (e.g., see aerial vehicle capture countermeasure 134a or 134b of FIG. 1).

As an overview, and in one example with particular reference to FIGS. 1 and 2, the system can comprise the external aerial vehicle detection system 100 configured to detect incoming target aerial vehicles 104a and 104b that may be a threat to infrastructure and/or assets within an airspace area A (e.g., infrastructure, such as buildings, airports or airfields, utilities, power plants, sports stadiums or complexes, and others; and assets, such as property, airplanes, personnel and others). The external aerial vehicle detection system 100 can be configured to obtain and communicate information about the detected target aerial vehicles 104a and 104, such as their tracked position(s) periodically over time or in real-time, their altitude, their trajectory, their velocities, and any other sensed or acquired information pertaining to the target aerial vehicle(s) 104a and 104b. Once obtained, this information can be communicated to the counter-attack UAV(s) 102a-d and 102e-h, so that one or more groups or swarms of counter-attack UAVs 102a-d and 102e-h can intercept and neutralize the respective target aerial vehicles 104a and 104b, as further detailed below. The target aerial vehicles 104a and 104b can be any type, such as, but not limited to, unmanned single or multi-rotor UAVs or fixed-wing UAVs (or tilt rotor UAVs), and others, that can be operated autonomously or manually. Alternatively, the target aerial vehicles 104a and 104b can be manned vehicles, such as a manned helicopter, manned propeller airplane, or other manned aerial vehicles. As mentioned, target aerial vehicles 104a and 104b (e.g., multi-rotor UAVs) can be significant threats because they can ascend/descend vertically up to several kilometers in airspace, can hover for many minutes, are extremely agile, fast, and maneuverable around obstacles, have small visual/IR/radar signatures, and can transport substantial payloads. Therefore, quickly detecting and tracking their positions and velocities within a relatively short timeframe (e.g., a few seconds) is critical to effectively prevent breach of the airspace area A, and more importantly to protect assets associated with the monitored airspace area A.

To "intercept" can mean that a counter-attack UAV, such as counter-attack UAVs 102a-d and/or 102e-h are flown into a position relative to a target aerial vehicle (for example, target aerial vehicle 104a) that permits the counter-attack UAVs 102a-d to perform a neutralizing function with respect to the target aerial vehicle 104a. This can include, but is not limited to, flying the counter-attack UAVs 102a-d into a projected flight path of the target aerial vehicle 104a, or along a flightpath offset from, but proximate the target aerial vehicle 104a, or to a position proximate the target aerial vehicle 104a, or along a flightpath behind the target aerial vehicle 104a, or along any other flight path or to any position where the counter-attack UAVs 102a-d are in close proximity to the target aerial vehicle 104a.

The external aerial vehicle detection system 100 can be supported by or associated with a ground-based structure, a vehicle (e.g., land, sea, or air), a movable platform, or other platform that can support a number of components discussed herein as associated with the external aerial vehicle detection system 100. The external aerial vehicle detection system 100 can comprise a number of sensors or platforms spaced apart from each other around an area or about different structures, and that can each be communicatively coupled to each other and/or a central computer system for controlling gimbals, for pointing positions, for processing data associated with target aerial vehicle(s), and for communicating command data to one or more counter-attack UAVs. Note that a plurality of aerial vehicle detection systems (e.g., 100) can be incorporated around an area to protect a larger airspace, and which can each have a computer system communicatively coupled to the computer systems of the other aerial vehicle detection systems to cooperatively monitor and protect a given airspace.

As more particularly shown in FIG. 2, the external aerial vehicle detection system 100 can comprise at least one detection sensor 106a (where, although not shown, up to n number of detection sensors are contemplated, as will be appreciated by those skilled in the art) operable to collect and generate data associated with the target aerial vehicle(s) 104a and 104b (e.g., velocity, geolocation, altitude, trajectory or flight path, and others). For example, the detection sensor(s) 106a can comprise one or more acoustic sensor(s), such as acoustic sensor 108a, and one or more camera(s), such as camera 110a that are operable to collect and generate data associated with the target aerial vehicle(s) 104a and 104b. The detection sensor(s) 106a can comprise other target acquisition assets, such as radar device(s) 107a, LIDAR device(s) 109a, and/or binocular(s) 111a, each coupled to a CPU 112 and having the capability to measure azimuth elevation/tilt angle of a target aerial vehicle. The detection sensor(s) 106a can further comprise other sensors, such as electromagnetic signature sensors used to detect a target aerial vehicle prior to taking-off, and/or cameras operating over a different portion of the electromagnetic spectrum from LWIR to SWIR to visible. Other possible sensors include narrow band light emitters with detectors (e.g., cameras) that have their detection band closely matched to those of the light emitters, and/or other sensors such as narrow band light emitters (e.g., UV sources) that may make portion the target fluoresce in a different portion of the electromagnetic spectrum facilitating its detection. Note that the detection sensor(s) 106a may be able to detect multiple target aerial vehicles at the same time, wherein the CPU 112 (or multiple CPUs) can be configured to determine which sensor(s) is/are most credible or reliable for target aerial vehicle(s), and then configured to assign one or more of such sensor(s) to continue to track and monitor the target aerial vehicle(s) while un-assigning other sensor(s) from tracking particular target aerial vehicle(s). This concept is further discussed below regarding the "credibility hierarchy".

In some examples, the acoustic sensor(s) 110a can comprise one or more microphones that can detect and track target aerial vehicle(s) 104a and 104b at a large distance (e.g., up to 500 meters, or more). A database of UAV signatures can be obtained or built and accessed by a CPU 112 of the aerial vehicle detection system 110a to determine the existence and type of the detected target aerial vehicle(s) 104a and 104b. In this manner, the CPU 112, utilizing a processor, can eliminate or ignore the signatures of any (friendly) counter-attack UAV(s) 102a-c that may be in flight while detecting the signatures of target aerial vehicle(s) 104a and 104b (assuming the "friendly" and "enemy" UAVs are different types of UAVs, or assuming the CPU 112 is programmed to differentiate between the two, such as based on known positions of counter-attack UAVs).

In some examples, one or more sensor(s) or camera(s) 114a (e.g., IR, optical, CCD, CMOS) can be incorporated as one or more of the detection sensors 106a of the external aerial vehicle detection system 100. For instance, infrared (IR) camera(s) can be implemented into the system and directed toward a particular airspace for viewing possible incoming target aerial vehicles. IR cameras are useful in this system because they can assist to overcome environmental problems experienced by other sensors (e.g., optical cameras), because IR cameras can operate in the dark or in foggy, dusty, or hazy conditions. IR cameras utilized in this system have the additional advantage that the IR signal from a target aerial vehicle (e.g., a UAV) is very different from that of birds in flight. IR cameras based on the shortwave infrared (SWIR) spectrum can interact with objects in a similar manner as visible wavelengths, as it is reflective, bouncing-off objects. As a result, SWIR light has shadows and contrast in its imagery. Images from a SWIR camera are comparable to visible images in resolution and detail. An atmospheric phenomenon called night sky radiance or night glow emits five to seven times more illumination than starlight, nearly all of it in the SWIR wavelengths. Because of this, SWIR cameras can see objects with great clarity on moonless nights. Such SWIR camera(s) can be incorporated into the present external aerial vehicle detection system 100 (and/or into the counter-attack UAV(s)). Longwave infrared (LWIR) cameras are more optimal for outdoor use because they are less affected by radiation from the Sun than with SWIR cameras. As such, LWIR camera(s) can be incorporated into the external aerial vehicle detection system 100 to benefit from the advantages of outdoor use to detect and track target aerial vehicle(s). Other camera(s), such as optical cameras (e.g., HD, 4K), can also be incorporated as detection sensor(s) 106a of the external aerial vehicle detection system 100 to assist with detection and tracking the position of target aerial vehicle(s) 104a and 104b.

In some examples, one or more telephoto lenses can be operable and incorporated with one or more of the SWIR and LWIR camera(s), and/or optical camera(s), and can be mounted on high-resolution motorized gimbals (e.g., 2 or 3-axis gimbals) associated with the external aerial vehicle detection system 100 to assist with detecting and tracking the dynamic position(s) of target aerial vehicle(s) 104a and 104b, including the angular position and/or azimuth elevation, in some cases depending on the type of sensor employed. Two or more detection sensors described herein can be used to compute range of a target aerial vehicle. Moreover, a particular camera (e.g., IR, optical) can be used in conjunction with an on-board (or remotely supported) laser range finder to determine the position of the target aerial vehicle in three-dimensional space (e.g., distance, azimuth angle, and elevation angle). Such telephoto lenses and gimbals can each be operated to establish the pointing position (and to dynamically modify the pointing position) of the associated camera, and therefore adjust a field-of-view (FOV) 105a (FIG. 1), for instance, of a particular camera to keep a monitored target aerial vehicle 104a centered about the camera (the same is true for target aerial vehicle 104b being centered about a FOV 105b of a camera or sensor of the system 100). These telephoto lenses and gimbals can be operated manually or autonomously (discussed below) to continuously track a dynamic flight position or path of a particular target aerial vehicle. In one example, a 360-degree camera device (having IR or optical camera(s)) could also be integrated with the external aerial vehicle detection system 100 to monitor an entire 360-degree air space, which may or may not require a gimbal for operation to monitor such airspace.

Computer vision algorithms stored and processed by the CPU 112 of the external aerial vehicle detection system 100 can be implemented for automatic detection and tracking of the target aerial vehicle(s) 104a and 104b. Such computer vision algorithms can "pull" a moving object out of a static background and classify it by shape (i.e., feature detection). Other mechanisms for classification of target aerial vehicle(s) 104a and 104b include using neural networks, which are computer algorithms designed to mimic the workings of the human brain, that are trained to recognize known/stored images of profiles that may be similar to the particular detected target aerial vehicle(s) 104a and 104b. Those skilled in the art will recognize that various known algorithms can be implemented to achieve this functionality, including "convolutional neural network" (CNN) combined with fast detection, such as provided by the You Only Look Once (YOLO) detection architecture known in the industry. Once the target aerial vehicle(s) are detected by the computer vision system (e.g., CNN, YOLO), the gimbal orientation supporting the camera can be used to determine azimuthal and elevation of the target aerial vehicle. Information from multiple computer vision systems may be combined to calculate range in addition to azimuthal and elevation angle. The target classification and position information collected using the computer vision system can further be combined/fused with information collected from other sensor(s) (e.g., 106a) to increase the likelihood of detection, and/or accuracy of classification of the target aerial vehicle, and/or tracking of the position of the target aerial vehicle.

In some examples, Phase-Based Video Motion processing technology can be incorporated with the external aerial vehicle detection system 100 (e.g., software processed by the CPU 112). Phase-Based Video Motion processing technology amplifies very small motions that otherwise could not be detected. This technology is further described in U.S. Patent Pub. No. US20170000356A1 filed Jul. 1, 2015, which is incorporated by reference herein. Thus, small vibration motions inherent to target aerial vehicles (e.g., UAVs) can be detected, which can overcome the issues with using only cameras to detect and track target aerial vehicles. For instance, as similarly discussed in U.S. Patent Pub. No. US20170000356A1, a method executed by a processor (e.g., CPU 112) receives a video as input (e.g., video of a target aerial vehicle) and exaggerates subtle changes and micromotions. To amplify motion, the method does not perform feature tracking or optical flow computation, but merely magnifies temporal changes using spatio-temporal processing. This Eulerian based method, which temporally processes pixels in a fixed spatial region, reveals informative signals and amplifies small motions in real-world videos. The Eulerian-based method begins by examining pixel values of two or more images. The method then determines (with the processor) the temporal variations of the examined pixel values. The method is designed to amplify only small temporal variations. While the method can be applied to large temporal variations, the advantage in the method is provided for small temporal variations, such as when a target aerial vehicle is detected at long ranges. Therefore, the method can be optimized when the input video has small temporal variations between the images of a particular target aerial vehicle while in flight. The method can then apply signal processing to the pixel values. For example, signal processing can amplify the determined temporal variations, even when the temporal variations are small, such as vibrations of a target aerial vehicle as captured in successive images by an optical sensor of an external vehicle detection system of the present disclosure.

Once the target aerial vehicle(s) 104a and 104b have been identified in successive frames of video (e.g., using IR and/or 4K optical cameras, and/or other sensors such as Radar), autonomously tracking a dynamic flight position or path of the target aerial vehicle(s) 104a and 104b and fusing position information provided by different sensing methodology (e.g., camera and Radar) can be performed by utilizing a Kalman filter, extended Kalman filter, particle filters, or another variation of a Bayesian filter. These filters work by taking an estimate of the velocity, position, and orientation of the particular target aerial vehicle 104a, for instance, and then predicting where the target aerial vehicle 104a will be in the next frame of video, and/or Radar track. Then, the position of the target aerial vehicle 104a in the next video frame is compared with the predicted position, and the estimates for the velocity, position, and orientation are updated. During such tracking with one of the cameras 114a, a feedback control loop can autonomously and continually adjust the gimbal (supporting the particular camera) to keep the target aerial vehicle 104a centered about the FOV 105a of the camera (the same is true for target aerial vehicle 104b being centered about a FOV 105b of a camera or sensor of the system 100). This facilitates or maintains continuous tracking of a dynamic flight position of a particular target aerial vehicle. Common algorithms include centroid tracking, edge detection, feature-based algorithms, and area correlation tracking. Using this system of cameras and filters, the external aerial vehicle detection system 100 can detect and track, in real-time, a flight position or path of a particular target aerial vehicle.

Indeed, a number of detection sensors 106a can be positioned about a structure or platform of the external aerial vehicle detection system 100 in a manner that the detection sensors 106a can cooperatively and collectively monitor a perimeter of up to 360 degrees associated with an airspace around the position of the external aerial vehicle detection system 100 to protect an area (e.g., a 500+m radius of coverage of an airspace). Alternatively, the detection sensors 106a can be mounted and configured to point toward a particular area of interest less than 360 degrees of coverage, such as through a canyon, or other particular egress of importance relative to the protected area A.

In some examples, the external aerial vehicle detection system 100 can comprise at least one illumination device (see illumination device 116a), such as a laser or high-powered LED, operable to illuminate the detected target aerial vehicle 104a (while continuously tracking the target aerial vehicle 104a, as detailed above). A particular illumination device 116a can be mounted on a gimbal device (e.g., 3-axis) that is operable to modify a pointing position or direction of the illumination device to continuously direct the illumination device toward the target aerial vehicle 104a for constant illumination. In this manner, a controller (operatively coupled to the CPU 112) can be operated to control said pointing position based on the tracked position or flight path of the target aerial vehicle 104a. As will be discussed below, the counter-attack UAVs 102a-h can each have a band pass filter (on a camera) to detect the narrow frequency band of light illuminated onto the target aerial vehicle by the illumination device 116a of the external aerial vehicle detection system 100.

In another example of a detection sensor of the external aerial vehicle detection system (100), a telescope or a pair of human use binoculars equipped with azimuthal and elevation angle sensors can be used to locate a potential target aerial vehicle and transmit partial position information to the counter-attack UAV(s) (and/or to a CPU of the external aerial vehicle detection system). In another example the telescope or binocular based detection system can be equipped with a range sensor, such as a laser range finder, and the information provided by this range sensor can be combined with that provided by the azimuthal and elevation angle sensors thereby allowing the position of the target UAV to be tracked in 3D.

Once the target aerial vehicle 104a (for instance) is detected as entering a monitored airspace (e.g., within a 500 m radius of the external aerial vehicle detection system 100), the external aerial vehicle detection system 100 can transmit command data to at least one of the counter-attack UAV(s) 102a-d for purposes of neutralizing the target aerial vehicle 104a with the aerial vehicle capture countermeasure 134a (e.g., monofilament netting). Prior to receiving such command data, the counter-attack UAV(s) 102a-d may be in a grounded position at virtually any position(s) around the area A (e.g., on a base platform 400), as long as they are within a range of communication with the external aerial vehicle detection system 100. The command data can be generated by the CPU 112 and transmitted via at least one radio 118a-d to one or more counter-attack UAV(s) 102a-d. Optionally, a bi-directional free space communication link 113 can be utilized in replacement of (or to supplement) radios 118a-c. The command data can include location data, and can be associated with the detected position of the target aerial vehicle 104a, and the command data can include data pertaining to a flight path, altitude, longitude, latitude, GPS coordinates (degrees, minutes, seconds), and/or other data associated with a geolocation and/or flight path of a particular aerial vehicle. The command data can also include intercept data, such as information or instructions that command at least one of the counter-attack UAV(s) 102a-d to fly at a certain velocity to intercept a detected velocity and direction of a particular target aerial vehicle. The same holds true for counter-attack UAVs 102-h, in such example shown in FIGS. 1 and 7A.

The command data transmitted to the counter-attack UAV by the external aerial vehicle detection system 100 can also include aerial vehicle capture countermeasure deployment command data, such as information or instructions that instruct or command the counter-attack UAV(s) 102a-h to deploy a particular aerial vehicle capture countermeasure at a particular location and time, for instance. The command data can further include target aerial vehicle detection data, such as position data or information (discussed above), and even information other than position information, such as identification information about the type of UAV of the target aerial vehicle(s) detected by the detection sensor(s) 106a. Such information can aid the external aerial vehicle detection system 100 and/or the counter-attack UAV(s) 102a-h to determine the size, type (e.g., fixed or rotary wing), on-board features, and/or performance capabilities of a particular target aerial vehicle, for instance, which can affect the type of countermeasure to be deployed to neutralize the target aerial vehicle (as will be discussed and appreciated from the below discussion).

The command data can also include counter-attack UAV control data, which can include instructions (from the external aerial vehicle detection system 100) for controlling some or all aspects of the counter-attack UAVs 102a-h. In this manner, the counter-attack UAVs 102a-h can be "dummy" drones that have disabled or overridden internal flight controls, so that the external aerial vehicle detection system 100 can control flight, deployment, sensor pointing, etc. Therefore, the external aerial vehicle detection system 100 can detect and monitor the position or flight path of the target aerial vehicle 104b, for instance, with one detection sensor and processing unit, while controlling flight and countermeasure (e.g., net) deployment of the counter-attack UAVs 102a-h.

Using at least some of such command data, one or both groups of the counter-attack UAV(s) 102a-h can be guided or directed to be flown toward the position(s) (or predicted position), or within close proximity, of the respective target aerial vehicle(s) 104a and 104b for interception and neutralization purposes. This system discussed regarding FIGS. 1 and 2 is particularly advantageous in cases where the target aerial vehicle(s) 104a and 104b may be several kilometers away from the airspace area A, and even several kilometers in altitude. This is because it may be difficult for an individual counter-attack UAV to know where to "look" (and which direction to fly) in a plausibly large amount of airspace and at possible long ranges. This is because many on-board cameras of a counter-attack UAV can only detect, identify, and classify targets at larger ranges (e.g., greater than 100 m), if the FOV is significantly reduced (e.g., 10 degrees or less).

As discussed above, the external aerial vehicle detection system 100 can operate the plurality of detection sensors (e.g., two or more of detection sensors 106a) to generate position data associated with a target aerial vehicle. The CPU 112 can then operate to eliminate position data associated with one or more of the detection sensors based on a credibility hierarchy associated with the plurality of detection sensors. Such credibility hierarchy can be based on environmental conditions. For instance, when operating during daytime and with no clouds, the credibility hierarchy could include position data derived from the following list of prioritized detection sensors: (1) an optical camera, (2) binoculars, (3) IR camera(s), (4) a radar device, (5) a LIDAR device, (6) an acoustic sensor, (7) an illumination device, and (8) other sensors. More specifically, once the CPU 112 has determined or knows of such environmental conditions, the CPU 112 can eliminate position data associated with sensors 3 through 7 (and/or un-assign such sensors from operating), while using position data generated from (1) the optical camera and (2) the binoculars (e.g., assigned detection sensors). Ideally, position data generated from the optical camera(s) would be the most credible during daytime in daylight without clouds, birds, etc. However, if signals generated from (2) the binoculars are more credible for any particular reason (e.g., the binoculars have less intermittent signal loss than the optical camera), then the CPU 112 can eliminate the position data generated from the optical camera, and use the position data generated from the binoculars, and then communicate the position data to one or more counter-attack UAVs. Such processing of eliminating certain position data can occur many times per minute, so that the best tracking information is generated and processed by the external vehicle detection system 100 for transmitting to the counter-attack UAVs, thereby improving or increasing the chances of intercepting and capturing the detected target aerial vehicle(s).

In another example of credibility hierarchy, assume the operating conditions are at night and with cloud cover, such that very little light is emitted to an area to be monitored by the external vehicle detection system 100. Here, the credibility hierarchy may be as follows: (1) IR camera(s), (2) an acoustic sensor, (3) a radar device, (4) a LIDAR device, (5) an illumination device, (6) other sensors, (7) optical camera, and (8) binoculars. This is because at night, IR camera(s) may generate the most credible position data, as discussed above. Thus, the CPU 112 can eliminate position data generated from detection sensors 4 through 8, and then analyze the signals generated from detection sensors 1 through 3 to determine the most credible position data generated. For instance, if the acoustic sensor is getting interference from other sounds, and if the radar device is affected by weather pattern, then the CPU may only use position data from the IR camera(s) as the most credible position data (and only data) for transmitting to the counter-attack UAV(s) to increase the chances of intercepting and capturing the detected target aerial vehicle(s).

It should be appreciated by those skilled in the art that the CPU 112 can include a tangible and non-transitory computer readable medium comprising one or more computer software modules configured to direct one or more processors to perform the method steps and operations described herein.

As illustrated in FIG. 3, a particular counter-attack UAV 102a (for instance) can comprise one or more optical sensors (e.g., see optical sensor 119), and/or other detection sensors 120. The optical sensors 119 and the other sensors 120 can be operatively coupled to a CPU 122 for processing data generated by the optical sensors 119 and the other sensors 120 associated with position(s) of the target aerial vehicle(s) 104a and 104b.

The counter-attack UAV 102a can further comprise a wireless communication device, such as a radio 124 (e.g., Mobilicom software defined radio or other similar radio), that can wirelessly receive the command data from the external aerial vehicle detection system 100, and then can transmit the command data to the CPU 122 for processing. The radio 124 can be used to communicate a video feed, captured by the optical sensor(s) 119, back to the external aerial vehicle detection system 100 (or to another external computer system, or even to a manually-monitored display).

Based on the received command data, the counter-attack UAV 102a can operate autonomously to fly in a direction toward the detected position of the target aerial vehicle 104a to intercept the position or flight path of the target aerial vehicle 104a. More specifically, the counter-attack UAV 102a can comprise a flight controller 126 coupled to the CPU 122 for receiving command signals associated with the command data processed by the CPU 122. The flight controller 126 can then control the various rotor assemblies (e.g., see rotor assembly 128) that each comprises an electronic speed controller 130 and a motor/propeller 132 to causes the counter-attack UAV 102a to operate autonomously in flight. Thus, the CPU 122, the flight controller 126, and the rotor assemblies 128 can define a flight control system 133 that is operable to facilitate flight of the counter-attack UAV 102a to intercept the target aerial vehicle 104a, as further described herein.

Updated command data can be continuously communicated to at least one of the counter-attack UAVs 102a-d, for instance, so that the flight controller 126 can control flight of the particular counter-attack UAV 102a, as corresponding to a tracked flight path or position of the target aerial vehicle 104a. In this manner, the counter-attack UAVs 102a-d can intercept the target aerial vehicle 104a, and can then neutralize the target aerial vehicle 104a with an aerial vehicle capture countermeasure 134a coupling together the counter-attack UAVs 102a-d, as further exemplified below regarding FIGS. 6A-6F. Similarly, the counter-attack UAVs 102e-h can intercept the target aerial vehicle 104b, and then neutralize the target aerial vehicle 104b with an aerial vehicle capture countermeasure 134b coupling together the counter-attack UAVs 102e-h, similarly as further exemplified below regarding FIGS. 7A and 7B.

The optical sensors 119 (and/or the other sensors 120) and the CPU 122 can define an on-board aerial vehicle detection system 137 that is operable to detect the target aerial vehicle 104a on its own, in one example (e.g., without the assistance of an external aerial vehicle detection system). Thus, the counter-attack UAV 102a can detect the target aerial vehicle 104a (assuming it is within range), and then the CPU 122 can generate command data, which it can then transmit signals associated with the command data to the flight controller 126 to facilitate flight of the counter-attack UAV to intercept the target aerial vehicle 104a. Such on-board aerial vehicle detection system 137 can be operated in conjunction with the external aerial vehicle detection system 100 to track a dynamic flight position of the target aerial vehicle 104a, so that if the external aerial vehicle detection system 100 is unable to do such, then the on-board aerial vehicle detection system 137 can continue to such on its own as a back-up detection system.

Concurrently (or alternatively) before the counter-attack UAVs 102a-d depart from a grounded position toward the target aerial vehicle 104a, command data from the external aerial vehicle detection system 100 can be processed by the CPU 122 of the counter-attack UAV 102a (and/or others) to control a pointing position of the optical sensor(s) 119 to "tell" the counter-attack UAV 102a where to "look" in airspace to find the target aerial vehicle 104a, in one example. Specifically, one of the optical sensors 119 can be rotatably mounted by one or more gimbal device(s) 138 to a flight body or platform of the counter-attack UAV 102a. The CPU 122 can then transmit control signals to gimbal controller(s) that control operation of the gimbal device(s) 138 (e.g., 3-axis gimbals) to establish and control a pointing position of the optical sensor (i.e., to point the camera toward the detected target aerial vehicle). As long as the target aerial vehicle 104a is within a detection range of the camera (e.g., up to 150 m, or more in some examples), the counter-attack UAV 102a can detect and track the position of the target aerial vehicle 104a on its own and without the assistance of the external aerial vehicle detection system 100, if necessary. Any of the other counter-attack UAV 102b-h can have such features and functionality as well.

In some examples, the other sensors 120 can comprise one or more radar device(s), such as compact phased array radars and automotive radars. Small phase array radar systems, such as the Echodyne Mesa-X7, Fortem Technologies TrueView R20, and automotive radar systems like the Delphi Automotive Radar, can be incorporated in the counter-attack UAV 102a, which have a range of ore than 200 m for small targets, such as small consumer drones (e.g., DJI Phantom 4). A radar array could also be used as a detection sensor of the external aerial vehicle detection system 100 for detection of a target aerial vehicle.

In some examples, in cases where the external aerial vehicle detection system 100 is unable to detect the target aerial vehicle 104a (e.g., due to weather, or intermittent signal losses), the counter-attack UAV 102a may be able to utilize its components (FIG. 3) to detect, track, and intercept the target aerial vehicle 104a. In such instances where the external aerial vehicle detection system 100 is not present or is usable, a number of counter-attack UAVs can be positioned around or about a ground surface (e.g., on platforms) associated with the airspace area A, such that their respective camera(s) are pointed in directions of interest. And, in response to detection of an incoming target aerial vehicle, the counter-attack UAV(s) can then autonomously detect, classify, track, intercept, and neutralize the target aerial vehicle (that is within the FOV and range of the on-board camera(s), as further discussed herein in various examples).

In examples where the aerial vehicle capture countermeasure comprises a net, the counter-attack UAVs 102a-d can support or carry a net control system comprising a net controller 140 operatively coupled to the CPU 122. A portion of a net assembly 146 can be coupled to a flight body or platform of each of the counter-attack UAVs 102a-d via a net/UAV interface device 148, such as a quick-release device or other coupling device. Once the target aerial vehicle 104a is captured, for instance (FIG. 1), a force sensor 150 (coupled to the net assembly 146 and the counter-attack UAV 102a) can sense the fact that the target aerial vehicle has been captured due to the mass of the captured target aerial vehicle 104a that exerts a force (gravity and air drag) to one or more of the counter-attack UAVs 102a-d by being captured in the net, for instance. The force sensor 150 may transmit a signal to the CPU 122 accordingly (or to the net controller 140), and then the net controller 140 can be operated to actuate a release device 142 to release the net assembly 146 and the captured target aerial vehicle 104a at a particular location (e.g., a safe location away from people or structures), as further detailed below regarding FIG. 6F. The release device 142 can be communicatively coupled to the CPU 122, which can cause transmission of a control signal to the release mechanism 214 to actuate the release device to separate the aerial vehicle capture countermeasure (e.g., net) from the counter-attack UAV 102a (and other counter-attack UAVs coupled by the net). Any suitable mechanical and/or electrical release mechanism can be incorporated that separates two bodies or parts from being coupled to each other.

The various components shown in FIG. 3 can be supported by or about a flight body 201 (FIG. 6A) of the counter-attack UAV 102a (and other counter-attack UAVs discussed herein). The flight body 201 can comprise a flight body, or a portion thereof, that structurally supports the components discussed regarding FIG. 3 (and that also supports a battery powering some or all of the components).

As illustrated in FIG. 1, and in one example, once the departed counter-attack UAV 102a-d are flown within a certain distance of the target aerial vehicle 104a (e.g., 10-150 m), such that the target aerial vehicle 104a is within a FOV 136a of the optical sensor(s) 119, the counter-attack UAV(s) 102a-d may utilize the optical sensor(s) 119 to continuously track the position of the target aerial vehicle 104a for interception and neutralization purposes (the same is true for detecting the target aerial vehicle 104b being within a FOV 136b of a particular sensor of one or more counter attack UAV(s) 102e-h). For example, a particular optical sensor can comprise a video camera, mounted on a gimbal device (supported and operated by the counter-attack UAV 102a), that can be operated to identify and track the target aerial vehicle 104a, similarly as discussed above regarding the detection sensors of the external aerial vehicle detection system 100. More specifically, a Kalman filter (or another variation of a Bayesian filter) can be executed as an algorithm by a processor of the CPU 122, and that uses digital signals generated by the video camera to estimate and predict the velocity, position, and orientation of the particular target aerial vehicle, and then executes a feedback control loop that autonomously and continuously adjust the gimbal device to keep the target aerial vehicle centered about the FOV 136*a* of the video camera, for instance. Such camera could be equipped with a long or medium focus telephoto lens to maximize the distance at which a target aerial vehicle may be identified and tracked at ranges up to 150 m to 300 m, in some examples, but at the cost of reducing the FOV of the camera. However, because the external aerial vehicle detection system 100 can transmit command data associated with a detected position of the target aerial vehicle 104*a* to one or more counter-attack UAVs 102*a-d*, a narrower FOV can be acceptable in some instances, if it means the on-board camera has a longer range of detection and tracking capabilities.

In some examples, one or more counter-attack UAVs 102*a-d* (and 102*e-h*) can be equipped with an optical camera (e.g., 119) having a narrow band pass filter, and accompanied by an optical frequency matched illumination source (e.g., high-power LED). The LED can be directed to illuminate the target aerial vehicle 104*a*, while reducing background contributions, so that the camera and filter can better detect and track the target aerial vehicle 104*a*. Such on-board camera and narrow band pass filter can also be used to detect only that frequency of light illuminated onto a target aerial vehicle by the illumination device 116*a* of the external aerial vehicle detection system 100, as initially mentioned above regarding the description of FIG. 1.

In some examples, each counter-attack UAV exemplified herein can utilize Visual Inertial Odometry (VIO) technology to assist with flying a path based on landmarks alone without the aid of GPS. VIO technology is the fusion of a monocular camera (or stereo tracked landmarks) and an IMU to lessen inherent drift of the IMU alone. It has been recently shown by Qualcomm Research (and others) that a drone can have less than 1% drift over a flight path of 650 m without the aid of GPS, when utilizing VIO technology. This allows for motion planning and obstacle mapping. Therefore, the counter-attack UAVs discussed herein can implement this VIO technology (along with a high resolution video (e.g., 4K), other low-resolution cameras, dual band Wi-Fi, GNSS, IMU, and a barometer sensor) to "track" a designated target aerial vehicle in which a swarm of counter-attack UAVs can follow its target aerial vehicle at some fixed distance and will navigate obstacles that may block its flight path. In some examples, each counter-attack UAV can utilize GPS-VIO fusion technology to assist with navigation in situations where GPS signals are intermittent (and therefore accurate satellite positioning is unavailable or inaccurate). In this scenario, each counter-attack UAV can comprise a sensor fusion position estimator (e.g., as part of the on-board CPU) to determine and/or update an accurate position. The sensor fusion position estimator can receive data from the on-board GPS device (intermittent signal), on-board camera(s), and an IMU. In this approach, a Kalman filter may be used to combine information from GPS and VIO when GPS is available, thus minimizing trajectory errors computed using VIO along in regions where only VIA is available. For this purpose Kalman filters may be used to estimate the state of the system (e.g. position, and speed) and fuse data obtained using different methods, such as GPS and VIO. Other approaches such as complementary filters, or Bayesian/Markov methods, may also be used to fuse data obtained from different sensing systems and methodologies.

In some examples, one or more counter-attack UAVs of a constellation of UAVs (e.g., 102*a-d* or 102*e-h*) may be different types of UAVs, and can have different types of detection sensors mounted thereto. For instance, a larger counter-attack UAV may support a relatively large radar device and a large 360 degree high-resolution camera, while a smaller counter-attack UAV may support a relatively small optical camera on a gimbal. Moreover, larger UAVs may be flown at an uppermost portion of the net, while the smaller UAVs may be flow at the lowermost portion of the net. Thus, a particular group or constellation of counter-attack UAVs supporting a net can be customized with selected detection sensors, and may be selectively positioned about the net based on their size, payload capacity, performance, etc.

With reference to FIG. 3 (and further applicable to FIG. 4), the counter-attack UAV 102*a* can have a GPS device 135 (e.g., a real-time kinematic (RTK) GPS) coupled to the flight controller 126 for determining and updating a position of the counter-attack UAV 102*a*. The counter-attack UAV 102*a* can comprise an inter-UAV swarm communication system comprising an inter-UAV radio 141 coupled to the CPU 122 for communication between other counter-attack UAV(s) to facilitate swarm or coordinated flight configurations, as detailed below regarding FIG. 4 and elsewhere herein. The inter-UAV swarm communication system can further comprise an inter-UAV position sensor 139 (e.g., ultra-wideband (UWB) tag) coupled to the CPU 122 to assist with determining individual position of the counter-attack UAV 102*a* to facilitate swarm or coordinated flight configurations with other counter-attack UAV(s) 102*n*.

In some examples, a human operator can control of the counter-attack UAV 102*a* and then operate its flight and deployment of the aerial vehicle capture countermeasure 134*a* to capture the target aerial vehicle 104*a*. A live video feed can be viewed by the human operator, and a remote control can be used to control the counter-attack UAV 102*a*. However, human reaction time is not as seamless or timely as compared to the autonomous tracking of the target aerial vehicle, and the autonomous navigation of the counter-attack UAV for interception and neutralization purposes.

In fact, with manned monitoring systems that require human monitoring to detect/track a target aerial vehicle, and then manned interaction or commands to deploy an aerial vehicle to intercept and neutralize the target aerial vehicle, it is impossible to do such within the few seconds, let alone within a few minutes. However, examples of the present disclosure provide autonomous detection and tracking of a target aerial vehicle with an aerial vehicle detection system, and then autonomous communication to one or more counter-attack UAV(s), and then autonomous interception and neutralization of the target aerial vehicle with the one or more counter-attack UAV(s), all within just a few minutes (or even a few seconds) and without human intervention or interaction. FIG. 4 illustrates a block diagram of a system of a plurality of counter-attack UAVs 302*a-n* (e.g., 102*a-d* and/or 102*e-h*, and up to n number of UAVs), and showing details of a particular example counter-attack UAV 302*a*, for tracking a target aerial vehicle (e.g., 104*a*). The counter-attack UAV 302*a* can have some or all of the similar features of the counter-attack UAV 102*a* described regarding FIG. 3. The counter-attack UAV 302*a* can be coupled to a plurality of counter-attack UAVs 302*b-n* by an aerial vehicle capture countermeasure 334, such as a net assembly, as detailed below and exemplified elsewhere herein.

The counter-attack UAV 302a can comprise a number of sensors operatively coupled to a CPU for processing data collected by the sensors (and the CPU can have a GPU). As some examples, the counter-attack UAV 302a can comprise some or all of the following sensors: (a) a temperature sensor; (b) a barometer/altimeter; (c) an inertial measurement unit (IMU) (gyro-accelerometer); (d) a compass (magnometer); (e) ultrasonic and optical flow sensors; (f) an optical range finder (e.g., LIDAR by Leddartch); (g) RTK-GPS and UWB tags; (h) stereo cameras (optical guidance system); (i) high resolution camera(s); (j) low resolution camera(s); (k) LWIR camera(s); and (l) gimbal position sensors. Sensors (a-e), (g), (i), and (j) can also be coupled to a flight controller and a video downlink radio, as illustrated. Based on the collected data from such sensors, the flight controller can be configured to operate one or more propellers/motors and gimbal devices for navigation of the counter-attack UAV 302a based on a (dynamic) position of a target aerial vehicle, similarly as described with reference to FIGS. 1-3.

One or more radio(s) (e.g., telemetry radio) can be coupled to the flight controller and to the CPU for transmitting data between the counter-attack UAV 302a and the external aerial vehicle detection system 100 (see e.g., FIG. 1). A video downlink radio can also be communicatively coupled between the counter-attack UAV 302a and a human operator to view a video feed on a display, for instance. A human operator can be associated with the external aerial vehicle detection system 100 for monitoring and supervising activity of the system.

The aerial vehicle capture countermeasure 334 can be a net assembly having the features shown and discussed in the examples herein, or it can be merely a net (or other entangling element) coupled to each of the counter-attack UAVs 302a-n. As a "net assembly", the aerial vehicle capture countermeasure 334 can comprise net coupling orientation sensors coupled between the actual netting material and each of the counter-attack UAVs 302a-n. Each net coupling orientation sensor can collect data associated with the respective position or orientation of the net relative to the respective counter-attack UAVs 302a-n, and then transmit such collected position/orientation data to the respective CPU for processing in order to control navigation of each counter-attack UAVs 302a-n in a coordinated manner, as further discussed below.

Similarly, net force sensors can be coupled between the net and respective counter-attack UAVs 302a-n to collect data associated with the respective forces acting on the net (e.g., wind drag, and/or pulling forces from other counter-attack UAVs 302a-n) relative to the respective counter-attack UAVs 302a-n. Such collected force data can be transmitted to the CPU for processing in order to control navigation of each counter-attack UAVs 302a-n in a coordinated manner, as further discussed below.

In some examples, the aerial vehicle capture countermeasure 344 can comprise net release devices coupled between the net and each of the counter-attack UAVs 302a-n for releasing the net and a captured target aerial vehicle (e.g., such as release device discussed regarding FIG. 6F).

During flight, the position of each counter-attack UAVs relative to each other is important when determining and controlling their respective navigations and their collective flight path, so that they do not impact each other or become entangled in a towed net, and so that they can effectively capture a target aerial vehicle. In some examples, each counter-attack UAV of the present disclosure can have one or more of a GPS device, an RTK-GPS device, UWB tags, a visual inertial odometry (VIO) technology, and/or a fusion of GPS and VIO (see e.g., FIG. 3). Most available UAVs (e.g., drones) have GPS incorporated in addition to IMUs, and when GPS is not available (e.g., insufficient number of satellites in-view), the UAV flies with its IMU alone, and generally must rely on commands from an operator for navigation (unless visual tracking is available on the UAV). The accuracy of standard GPS is approximately +/−2 m to +/−5 m, but there are many sources of error that give rise to the position uncertainty. Vertical accuracy is generally about half that of horizontal. Those GPS receivers that have WAAS (Wide Area Augmentation System) enabled will fall within +/−1 m of uncertainly, in the best cases. Thus, many UAVs could fly in a swarm configuration within about 2 m of each other with some degree of accuracy using GPS technology.

Another type of GPS that uses corrections to achieve better positional accuracies is RTK (real-time kinematic) GPS, which receives bands from GNSS (American), as well as others such as GLONASS (Russian) and Galileo (European Union). The important distinction is an added radio link from a ground based station (e.g., an external aerial vehicle detection system 100) sending corrections from a known location. This technique can achieve better than +/−5 cm, and typically +/−2 cm positional accuracy, for a swarm or plurality of counter-attack UAVs operating in a coordinated flight manner. Because of this, and in one example, each counter-attack UAV can utilize RTK-GPS technology to control a group counter-attack UAVs flying in a coordinated manner or formation.

In another example regarding the position of the counter-attack UAVs relative to each other, each counter-attack UAV can have UWB tags (FIG. 4) as accurate position sensors as a replacement or back-up for positioning purposes when GPS is unavailable. UWB ranging works by measuring the time of flight (TOF) of a very short (~9 ps) pulse transmitted between two UWB tags. Generally regarding UWB tags, using a precise clock, a node 1 sends a packet to node 2, and node 2 measures the precise Time of Arrival (TOA) of the packet. It then returns a packet that includes the total time from TOA of the request packet to transmission of the return packet. Node 1 can then determine the TOF of the two packets and determine an accurate distance between the two Nodes. Ranges in free space can be as far as 410 m with accuracy of greater than 10 cm. A typical ground-based three-dimensional measurement system consists of 3 to 4 anchor tags with well-known positions. There can then be multiple target tags within that space whose position in three-dimensions can be accurately measured. UWB tags can be used to determine accurate positions within a UAV cooperative constellation (i.e., counter-attack UAVs cooperative constellation). This uses peer-to-peer ranging between each of the UWB tags to determine an accurate distance between counter-attack UAVs. This is similar to an anchored tag configuration except that the UWB tags on the counter-attack UAVs are the equivalent of the anchor tags with unknown positions. The information provided by the peer-to-peer ranging by itself is not complete enough to solve an exact (x, y, and z) coordinate position of each counter-attack UAV.

Figure 5:
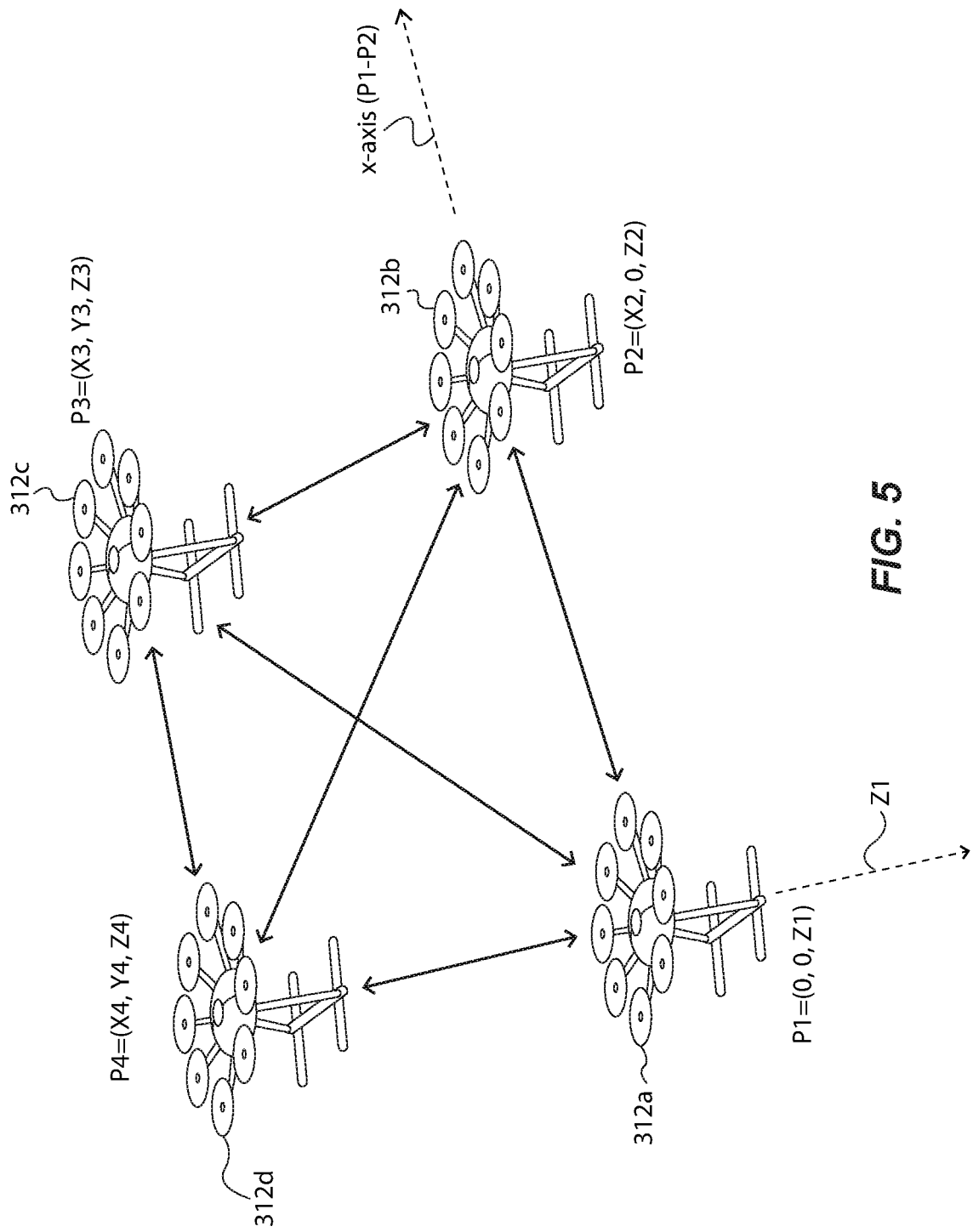
FIG. 5 illustrates a method of calculation for coordinated flight control of a plurality of counter-attack UAVs in a swarm or coordinated configuration, and that can support an aerial vehicle capture countermeasure, in accordance with an example of the present disclosure.
Figure 6C:
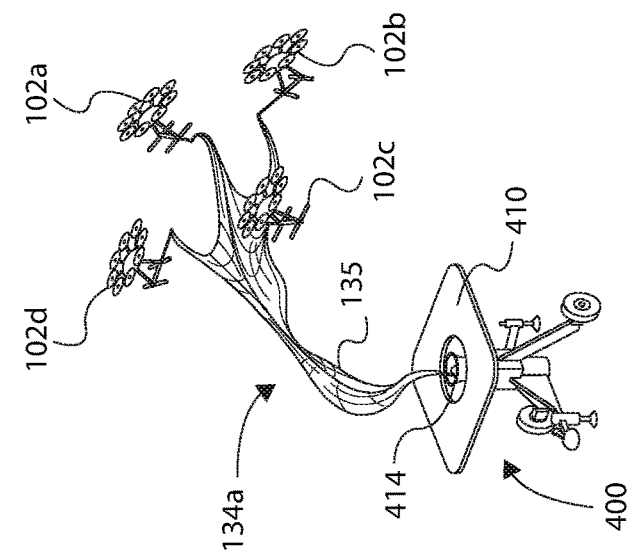
FIG. 6C illustrates the counter-attack UAVs being deployed from the base station of FIG. 6A, and pulling the aerial vehicle capture countermeasure from the retainer device of FIG. 6B.
Figure 6B:
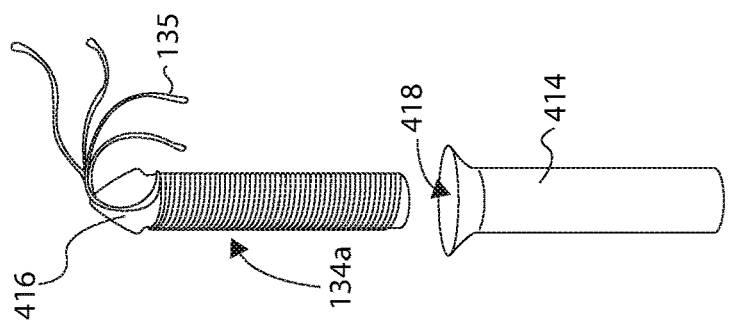
FIG. 6B illustrates a retainer device that supports and retains the aerial vehicle capture countermeasure of FIG. 9A.
Figure 6A:
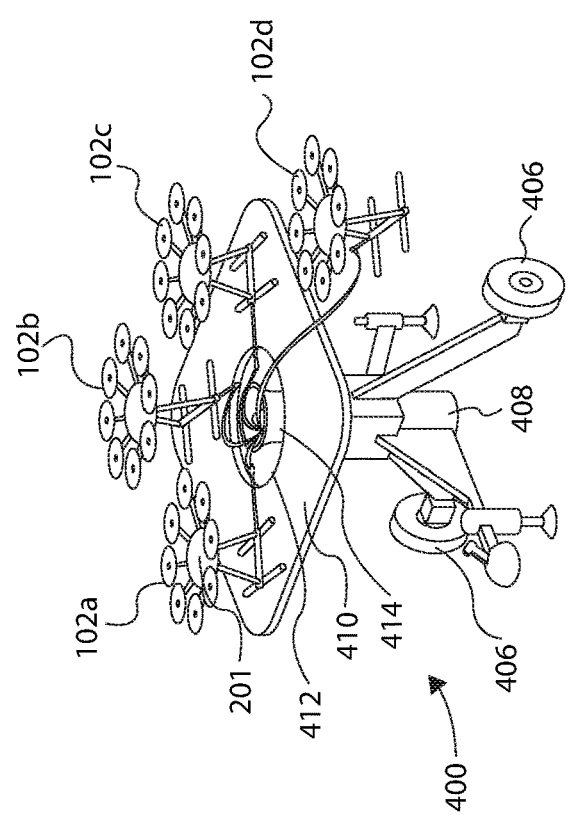
FIG. 6A illustrates a system for supporting and deploying a plurality of counter-attack UAVs, carrying an aerial vehicle capture countermeasure, and from a base platform in accordance with an example of the present disclosure.

Therefore, in one example as illustrated in FIG. 5, a relative positioning solution can be calculated if one of the three coordinates is known (e.g. altitude (z) and a position (P1) arbitrarily designated as the origin node of a first counter-attack UAV 312a). Using an altimeter on each counter-attack UAV 312a-d (and any other group of UAVs exemplified herein), the z-coordinate is determined, then defining the x-coordinate line from P1 to P2 (position of a second counter-attack UAV 312b) as the x-axis, there are then five unknown equations that relate distance P2 to P3, P3 to P4, P1 to P4, P2 to P3 and P1 to P3 with five variables to solve for (x2, x3, y3, x4, y4). Several numerical method, such as the well-known Newton method, have been developed to solve non-linear set of equations of this type. Alternatively GPS coordinates could be used as starting coordinates and the UWB distances used to correct for the GPS error. UWB tags could also be used for peer-to-peer communications.

In some examples, each counter-attack UAV can utilize GPS-VIO fusion technology to assist with navigation in situations where GPS signals are intermittent (and therefore accurate satellite positioning is unavailable or inaccurate). In this scenario, each counter-attack UAV can comprise a sensor fusion position estimator (e.g., as part of the on-board CPU) to determine and/or update an accurate position. The sensor fusion position estimator can receive data from the on-board GPS device (intermittent signal), on-board camera(s), and an IMU, similarly as described above.

FIGS. 6A-6F illustrate a system and method to intercept and neutralize a target aerial vehicle with the plurality of counter-attack UAVs 102a-d, as initially discussed regarding the example in FIG. 1. The plurality of counter-attack UAVs 102a-d can be supported and deployed from a base platform 400 in response to detection of the target aerial vehicle 104a to neutralize the target aerial vehicle 104a with an aerial vehicle capture countermeasure 134a (e.g., a net). Similarly, as described above, the counter-attack UAVs 102a-d can be communicatively coupled to the external aerial vehicle detection system 100 that is configured to communicate command data to one or more of the counter-attack UAVs 102a-d associated with a detected position of the target aerial vehicle 104a. Alternatively, each counter-attack UAV 102a-d can have a number of sensors and devices that facilitate detection and tracking of the target aerial vehicle 104a, such as described with reference to the counter-attack UAVs 302a-n of FIG. 4. Thus, the counter-attack UAVs 102a-d can be deployed from the base platform 400 (or other platform or surface) based on command data transmitted from the aerial vehicle detection system 100 to the counter-attack UAVs 102a-d.

In one example, the base platform 400 can comprise a mobility mechanism, such as wheel(s) 406, that are movable about a surface to establish or modify the position of the base platform 400. The wheel(s) 406 can be motorized (e.g., by an electric motor(s)), and can be manually or autonomously operated to move the base platform 400 about a surface. In the autonomous example, the base platform 400 can comprise a controller that can receive command data from the external aerial vehicle detection system 100, and the controller can control the electric wheel(s) to move the base platform 400 to a different location based on the position of one or more target aerial vehicles. Alternatively, the base platform 400 can be statically mounted or coupled to the ground or to a structure, such as a building, vessel, etc. The base platform 400 can also be attached to a vehicle and towed to a desired location, or mounted on a vehicle and moved to a desired location.

In one example, the base platform 400 can comprise a base support 408 supporting a launch deck 410. The launch deck 410 can have a planar surface and can comprise a central opening 412 that facilitates deployment of the aerial vehicle capture countermeasure 134a. In one aspect, the base platform 400 can comprise a net retainer device 414 containing and supporting the aerial vehicle capture countermeasure 134a (e.g., a net 135) when the plurality of counter-attack UAVs 102a-d are in the grounded position of FIG. 6A. Specifically, the net 135 can be wrapped or coiled around a removable shaft 416, and then both the wrapped net 135 and the removable shaft 416 can be stored in an opening or bore 418 of the net retainer device 414. The removable shaft 416 can have a rounded and chamfered upper end so that the net 135 can be appropriated retained about the removable shaft when in the counter-attack UAVs 102a-d are in the grounded position, yet vertically unspooled from the removable shaft 416 in response to flight of the counter-attack UAVs 102a-d. The net retainer device 414 can be generally vertically supported by the base support 408 in a manner such that the opening 418 is exposed through or adjacent the central opening 412 of the launch deck 410. Therefore, in response to detecting the position of the target aerial vehicle 404, the counter-attack UAVs 102a-d can autonomously depart from the base platform 400 in a coordinated flight manner with each other. Such flight causes the net 135 to be withdrawn or unspooled from the net retainer device 414, thereby freeing it from the base station 400.

In some examples, a net containment device, such as a mesh sock, can bundle or contain most or all of the net 135 during transport which can provide a low-drag, low-profile net in-tow until ready for deployment just before intercepting the target aerial vehicle 104a. The net containment device can be just relatively small in diameter, such as half of an inch up to 5 inches for larger nets. The net containment device can automatically slide off of the net 135 in response to separation of the counter-attack UAVs 102a-d causing the net to deploy or expand, as shown in FIG. 6E. This can net containment device can minimize or reduce a drag force imposed by the net 135 on the counter-attack UAVs 102a-d during flight when the counter-attack UAVs 102a-d are in a tight swarm configuration.

During flight, the counter-attack UAVs 102a-d can be operable to navigate and fly a coordinated flight manner, such as in a tight swarm while transporting the aerial vehicle capture countermeasure 134 in a folded or bundled configuration, as in FIG. 6D. The counter-attack UAVs 102a-d can each have some or all of the navigation devices and systems discussed regarding FIGS. 4 and 5, which facilitates communication between the counter-attack UAV 102a-d regarding their relative positions for coordinated flight and navigation, as detailed above. Based on their relative positions, each counter-attack UAV 102a-d can individually and autonomously control its own navigation and flight pattern to navigate toward the target aerial vehicle 104a in a coordinated flight manner (e.g., a tight swarm while carrying the net 135).

In a specific example, the counter-attack UAVs 102a and 102b may be flying about 2 m apart (generally horizontally from each other), while the counter-attack UAVs 102c and 102d may be flying about 3 m apart (generally horizontally from each other) and about 3 m below the counter-attack UAVs 102a and 102b (while the net 135 is towed behind the swarm). Once this "tight swarm" of counter-attack UAVs 102a-d have intercepted a detected target aerial vehicle 104a (as detailed above), the counter-attack UAVs 102a-d can autonomously fly away from each other (e.g., diagonally from center) to deploy and fully extend the net 135 to a capture or deployed position, as shown in FIG. 6E.

Such autonomous flight control can be initiated by the counter-attack UAVs 102a-d continuously communicating their respective positions to each other, while their respective CPUs are programmed to communicate control signals to their respective flight controllers to fly in a particular direction at a particular speed/acceleration for a particular time until the net 135 is fully expanded or deployed. Such control signals can be based on a known size of the net 135 (i.e., a 20 m tall by 40 m wide net) so that the counter-attack UAVs 102a-d are operated to fly to a location represented by the corners of the rectangular net, for instance. Alternatively, each counter-attack UAV 102a-d can process data provided by on-board net force sensor and net coupling orientation sensors (FIG. 4), which sense the orientation of the net and the pulling force on the net 135 proximate each corner of the net 135 where coupled to respective counter-attack UAVs 102a-d, as also exemplified regarding FIG. 3.

Once the target aerial vehicle 104a is captured in the net 135, the counter-attack UAVs 102a-d can be operated to drop or release the net 135 and the captured target aerial vehicle 104a at a particular location. In this manner, the counter-attack UAVs 102a-d can sense the existence of the captured target aerial vehicle 104a (e.g., via force sensors coupled to the net and the UAVs 102a-d). The counter-attack UAVs 102a-d can then fly in a coordinated manner while towing the net 135 and the captured target aerial vehicle 104a. The counter-attack UAVs 102a-d can each operate a release device (e.g., FIGS. 2 and 3) to release the net 135 from being supported by the counter-attack UAVs 102a-d. The counter-attack UAVs 102a-d can choose a safe location to drop the net 135 and the captured vehicle 104a using object recognition (discussed above), or the counter-attack UAVs 102a-d can be commanded to a particular location by the external vehicle detection system 100 to release the net 135 and the captured vehicle 104a, or the counter-attack UAVs 102a-d can be programmed to autonomously fly/operate to a particular location for releasing thereof.

The aerial vehicle capture countermeasure 134a and the captured target aerial vehicle 104a can then be retrieved based on a tagged position of the drop zone (as programmed recorded by the CPU 122), and the target aerial vehicle 104a can be removed and the aerial vehicle capture countermeasure 134a can be re-used for another operation.

In some examples, even when the net 135 is in the deployed position, the counter-attack UAVs 102a-d can continue to monitor and track the dynamic position of the target aerial vehicle 104a, and thereby continue to fly in a coordinate manner for a period of time to intercept and capture the target aerial vehicle 104a. This is because of the advantage of the low-drag configuration of the net 135 being comprised of very thin, high-strength monofilament elements, for instance, and configured having a relatively large mesh shapes (e.g., up to 500 cm mesh size, in some examples). If for some reason the target aerial vehicle 104a is unable to be captured (e.g., using evasive techniques or is too fast), or is no longer a threat (whether determined by the external aerial vehicle detection system 100, and/or one or more counter-attack UAVs 102a-d), the counter-attack UAVs 102a-d can return to a tight swarm configuration (FIG. 6D) and return to a particular location (e.g., to the base platform 400), or they can continue to monitor an airspace for possible incoming target aerial vehicle(s) if on-board battery power permits.

In some example, the at least one flexible entangling element of the examples described herein can comprise at least one of a net, filament(s), monofilament(s), braided filament(s), tendril(s), fiber(s), string(s), cord(s), strand(s), thread(s), rope(s), or wire(s). That is, virtually any flexible or semi-flexible element can be implemented that is capable of being entangled in a rotor assembly of a target aerial vehicle (or any element that is capable of being drawn into a jet engine or turbine, in examples where the target aerial vehicle is devoid of rotors/propellers). Said another way, any flexible entangling element that is capable of moving between a stowed position to a deployed position can be implemented. More specifically and in one example, certain larger diameter cords or ropes formed in a net may not necessarily wrap around or entangle around the rotors of a particular target aerial vehicle, but such "rope net" could still capture the target aerial vehicle due to the flexible nature of rope, and due to the fact that a plurality of counter-attack UAVs could entrap the target aerial vehicle inside the rope net by flying in a coordinated manner toward each other in a manner to bag or wrap-up the target aerial vehicle (like a sack). Moreover, many consumer UAVs (i.e., target aerial vehicles) are designed to automatically stop operation of their rotors when they impact something, so in response to impact of a particular flexible entangling element (e.g., cable, rope, etc.), this would still interrupt operation of the target aerial vehicle, even though such flexible entangling element may not have necessary been entangled in the rotors of the target aerial vehicle.

The net 135 (and other nets or filament elements discussed herein) can be manufactured as a number of different high-strength filaments. For instance, high-strength ultra-high molecular weight polyethylene (UHMWPE) fibers, such as Dyneema® produced by DSM, or Spectra® produced by Honeywell (i.e., monofilaments) can be utilized, which use long molecular chains to transfer loads within individual fibers. Other types will be apparent to those skilled in the art. Various pound test and mesh sizes can be used, depending on the application, such as, but not being limited to, 1.5-pound test and 2.25 square inch mesh may be suitable to capture any number of available UAVs, for instance. Some nets may have knots where they intersect, and others may be knotless netting that utilizes four-strand braiding techniques that eliminate knots.

The elimination of knots reduces drag and improves handling during deployment and stowage of a particular net, such as the net 135 and others discussed herein.

The strength of the net required to capture one or more target aerial vehicles will ultimately determine the type of filament needed. Based on the type of filament and its diameter, and based on mesh size and overall net coverage, it is necessary to balance aerodynamic drag at a given angle to ensure that the net does not deploy and then trail too far behind and horizontal from the counter-attack UAV when in tow and deployed. One or more counterweights could be used to prevent such effect by being coupled to the net or individual strands or filaments.

One primary advantage of various nets disclosed herein is the light-weight, low-drag features of the netting, which allows for a relatively large capture area or surface area. For instance, a 16-foot-wide and 550-yard-long net (covering 2,500 $m^2$) of 1.5-pound test monofilament, with about a 3-inch square average mesh size, can weight just 5 pounds. And, one support member being 16 feet long can weight just a few pounds itself, so the entire aerial vehicle capture countermeasure can weigh less than 10 pounds while covering 2,500 square m of capture surface area. Thus, each counter-attack UAV, having a 30-pound payload capacity, for instance, can readily tow such aerial vehicle capture countermeasure, even with a potentially high drag force (e.g., 10-20 pounds) when traveling at relatively high speeds to intercept a target aerial vehicle.

FIGS. 7A and 7B illustrate a system and method to intercept and neutralize a target aerial vehicle with a plurality of counter-attack UAVs 502a-d. In this example, the plurality of counter-attack UAVs 502*a-d* can be deployed in response to detection of a target aerial vehicle to neutralize the target aerial vehicle with an aerial vehicle capture countermeasure 534, such as a net 535. The counter-attack UAVs 502*a-d* can be operated according to the examples discussed above. The purpose of this example is to illustrate and describe the determination and calculation of net aerodynamic drag force estimations during transport and after deployment for a given configuration, which is important to prevent a given net from experiences too much drag force, thereby potentially interrupting or preventing controlled flight of the counter-attack UAVs 502*a-d*, and which can also cause the batteries of the counter-attack UAVs 502*a-d* to be depleted too quickly.

In one example, the net 535 can be configured in a low-drag transport configuration or position (e.g., folded, bundled, wrapped), such as shown in FIG. 7A, to minimize wind drag forces during transport and before being moved to a deployed capturing position of FIG. 7B. This helps to minimize power consumption on-board each UAV, which maximizes the distance and time the UAVs can operate, thereby increasing the likelihood of eliminating a particular target aerial vehicle.

The net 535 can be placed in the low-drag transport position in a number of ways, such as with a restraint device that wraps around the netting (e.g., a clip, harness, cord, etc. that can be removed, broken, or unlocked by a restraint device of one or more counter-attack UAVs 502*a-d* before deployment). Thus, a small electric actuator like a servo motor can actuate the restraint device to break a clip or band to facilitate deployment of the net 535. Other examples include breakable restraints, such as elastic bands, that are configured to be broken by a light force, such as just a few pounds resulting from pulling the net 535 with the counter-attack UAV(s) 502*a-d* when deploying the net 535 to its deployed position. Alternatively, the net 535 can be naturally bundled together (i.e., without any bundling devices) by closely flying pairs of counter-attack UAV (e.g., 502*a, b*, and 502*c, d*) within a meter or two of each other. In any scenario, the bundled net 535 can have a relatively small overall diameter or cross sectional area during transport, such as a few square centimeters in some examples.

Figure 8:
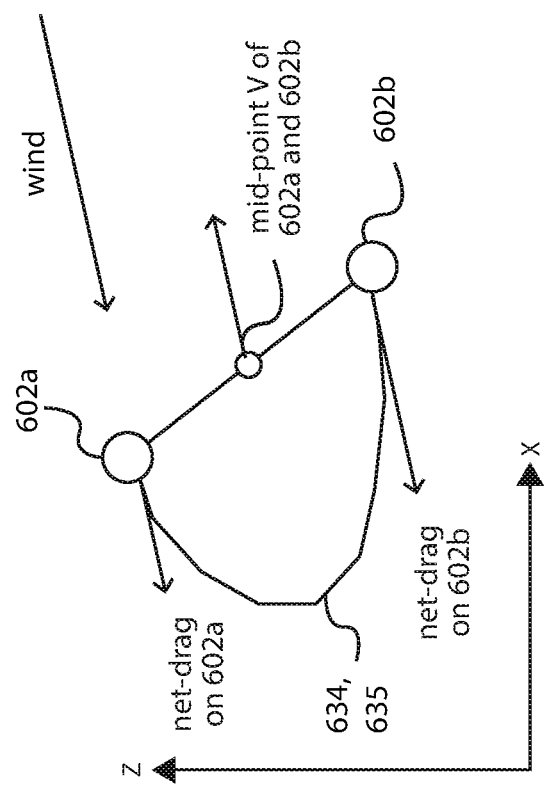
FIG. 8 schematically illustrates a calculation for controlled flight of a plurality of counter-attack UAVs carrying an aerial vehicle capture countermeasure in a stowed or folded position in accordance with an example of the present disclosure.

The estimation of aerodynamic net drag forces during transport (e.g., as in FIGS. 6D and 7A) is of importance to ensure proper orientation of the net 535 and proper navigation of the counter-attack UAVs 502*a-d* (because drag forces can affect the velocity and power consumption of each counter-attack UAVs 502*a-d* during flight). More specifically, FIG. 8 shows a schematic representing an estimation of net drag forces acting on first and second counter-attack UAVs 602*a* and 602*b* (which could each represent a pair of adjacent vehicles, such as in FIG. 7A). As can be appreciated, the relative wind speed during flight will make a towed aerial vehicle capture countermeasure 634 (e.g., a net 635) assume the shape of a catenary curve due to gravity and aerodynamic drag on the net 635. Solving for the equation of a catenary at a given velocity, and for arbitrary positions of the counter-attack UAVs 602*a* and 602*b*, provides the necessary reaction force components to apply to the equations of motion for each counter-attack UAVs 602*a* and 602*b*.

Calculation of reaction force components for each counter-attack UAV 602*a* and 602*b* requires transformation of coordinates for the support points of each counter-attack UAV 602*a* and 602*b* to align wind speed with the vertical axis. Next, for a known length of net, parameters of the catenary equation are solved and the force components subsequently calculated and rotated back into the global frame. That is, the relative wind speed direction is used to rotate the unmanned aerial vehicle 602*a* and 602*b* endpoints into a coordinate system where "gravity" is orientated vertically along the z-axis.

Knowing the total length of the net, parameters for the catenary equation are solved to determine its shape. The known wind velocity and associated drag per unit length of the net 635 are then used to calculate the vertical and horizontal force components to maintain the "chain" (i.e., the net) in force equilibrium. Finally, the force components are rotated back into the global coordinate system and applied to the respective drones as additional drag forces above and beyond their own drag.

Guiding of the unmanned aerial vehicles 602*a* and 602*b* is accomplished by controlling the midpoint between unmanned aerial vehicle 602*a* and 602*b*, as well as the rotational orientation and separation distance between them. The x-location and the z-location are used to determine midpoint position error and control the first set of x-thrust and z-thrust components for each counter-attack UAV 602*a* and 602*b*. Differential x-thrust is then used to control rotation and differential z-thrust is used to control separation, all using prescribed proportional control gains as input parameters. After the thrust components are applied, the magnitude of total thrust is limited to the maximum thrust available and each component is scaled appropriate to this end. This concept is further detailed above regarding the estimation of aerodynamic net drag forces during transport, and in the examples of the following paragraphs. Other methods of estimations can be utilized, including direct measurements of the air speed, orientation, and flight path of the net as followed by of the counter-attack UAVs, and measured force applied to the counter-attack UAVs, along with known performance envelope of the counter-attack UAVs to estimate appropriate capture strategies.

In one specific example, the counter-attack UAVs 602*a* and 602*b*, each weighing 2 kg and both possessing 100 N maximum thrust, can be launched or deployed from a grounded position to intercept a target located 1000 m downrange at a starting altitude of 300 m and traveling at 21 m/sec. After 18.5 seconds, the counter-attack UAVs 602*a* and 602*b* should be within a prescribed 50 m of the target and begin to deploy a 150 m long net. Their desired separation distance of 100 m is attained before meeting the target aerial vehicle after 24 seconds, where upon they slow to match the target aerial vehicle's velocity. As detailed above, even if the target aerial vehicle conducts an instantaneous reversal in course, the counter-attack UAVs 602*a* and 602*b* can continue to maintain position and follow along the new trajectory. In any event, the counter-attack UAVs 602*a* and 602*b* would normally accelerate to full speed to capture the target aerial vehicle in the net 635, to reduce the likelihood of losing the target aerial vehicle due to rapid velocity changes.

The estimation of aerodynamic net drag forces after deployment (FIG. 7B) is also of importance to ensure proper orientation of the net 535 for effective capture of the target aerial vehicle. For instance, a general vertical orientation of the net 535 is desirable to maximize the zone of capture. For instance, a deployed net trailing too far behind the counter-attack UAVs 502*a-d* (e.g., because of high wind drag forces at maximum speed of the vehicles) could have a small zone of capture because the net 535 may be collapsed or flattened. This is also dangerous because it could cause the counter-attack UAVs 502*a-d* to impact each other, or be caught in their own net. To this end, a formula for drag around a prismatic section can be used as follows:

$$F_{drag} = \tfrac{1}{2}\rho V^2 C_d A$$

Where ρ is the density of air, and V is the relative air velocity, and Cd is the drag coefficient (1.0 is appropriate for circular cross-sections), and A is the total frontal area presented to the freestream. For frontal area, the total length of filament within a given mesh area is multiplied by the filament thickness (but the presence of knots is ignored).

In one calculation of drag force as a function of speed and mesh size, a 30 m tall by 30 m wide deployed net, constructed with 1.5 pound nylon monofilament, having 0.2 mm in diameter with a test strength of 6 pound force/filament, the aerodynamic net drag force scales by the square of velocity, but is linear with the mesh density. Various mesh sizes/densities for such net (having a 900 m² coverage area) can be used to optimize the drag force for a given application. For instance, a diagonal mesh of 15 cm by 15 cm would have a higher drag force than a 30 cm by 30 cm diagonal mesh netting, particularly as the velocity increases where the drag forces increase in a non-linear manner. Ultimately, the strength of a particular net required to capture a target aerial vehicle will determine how thick the filaments need to be, which will determine the drag force (along with mesh size and coverage area).

Note that the counter-attack UAVs of the present disclosure can orient a particular net in various orientations to increase the likelihood of capturing a target aerial vehicle. For instance, the net can be oriented generally vertically to capture a tracked target aerial vehicle that is flying a generally constant horizontal direction relative to ground. Moreover, the net can be oriented horizontally to capture a tracked target aerial vehicle that is flying at a generally constant vertical direction relative to ground. Any angle or plane of the net can be held by the counter-attack UAVs depending on the flight path of the target aerial vehicle to be captured. In another example, the counter-attack UAVs, while traveling at some velocity, can "come together" towards each other in a manner that generates a 3D capture zone of a towed net, which can reduce the airspace from which a target aerial vehicle can escape or evade capture.

Figures 9A, 9B:
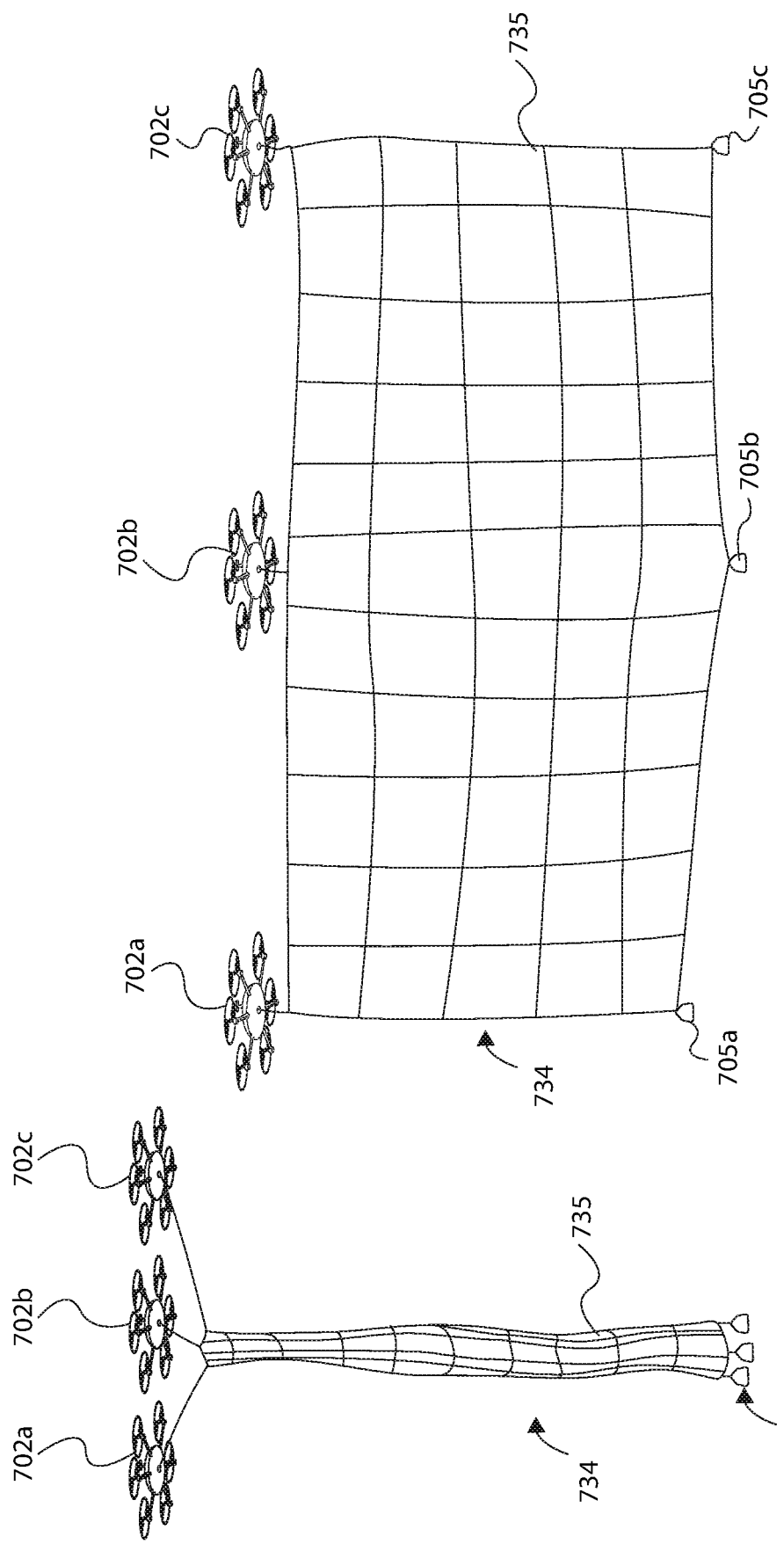
FIG. 9A illustrates a plurality of counter-attack UAVs being in flight and carrying an aerial vehicle capture countermeasure, having counterweights, and in a stowed or folded position in accordance with another example of the present disclosure.
FIG. 9B illustrates the counter-attack UAVs of FIG. 9A, and that maintain the aerial vehicle capture countermeasure in a deployed position to capture a target aerial vehicle.

FIGS. 9A and 9B illustrate a system and method to neutralize a target aerial vehicle with a plurality of counter-attack UAVs. In this example, the plurality of counter-attack UAVs 702a-c can be deployed (e.g., from the ground or a platform) in response to detection of a target aerial vehicle to neutralize a target aerial vehicle with an aerial vehicle capture countermeasure 734 (e.g., a flexible entangling element being a net 735). The counter-attack UAVs 702a-c can be operated according to the examples discussed above. The purpose of this example is to illustrate that at least one weighted component, such as one or more counterweight(s) 705a-c, can be coupled proximate a lower end of the net 735 to counteract aerodynamic net drag force during transport and after deployment of the net 735. This assists to prevent a given net from experiences too much drag force and being pulled too horizontally, which can potentially interrupt or stop flight of the counter-attack UAV(s) 702a-d.

In one example, the net 735 can be configured in a folded or bundled, low-drag state, such as shown in FIG. 9A, to minimize drag forces during transport before being moved to the deployed position of FIG. 9B. The net 735 can be folded or bundled such as described regarding FIG. 7A, and/or the counterweights 705a-c can be releasably coupled to each other, such as by a magnetic force that is broken in response to deployment of the net 735 by the departing counter-attack UAVs 702a-c. The bundled net 735 can therefore have a relatively small diameter or cross sectional area during transport, such as a few square centimeters.

Each counterweight 705a-c can be spatially separated from each other as coupled to the lower end of the net. In one example, only two counterweights (705a and 705c) may be necessary at corners of the net 735. In another example, only one counterweight may be used, such as an elongated rod coupled laterally along the lower end of a particular net. In another example, vertical rods can be coupled to along sides of a particular net, and such vertical rods could be coupled to a respective counter-attack UAVs.

Balancing of the total counterweight to versus a particular aerodynamic net drag force, at a given angle relative to vertical, is required in order to properly orient the net during flight when deployed (i.e., to prevent a trailing net from being too horizontal). For instance, at 15 degrees relative to vertical, and with a 10-pound drag force for a given net, approximately 20 pounds of total counterweight could be utilized. And, at 45 degrees relative to vertical, and with a 10-pound drag force for a given net, approximately 5 pounds of total counterweight would be needed. As can be appreciated, the total payload capacity of three counter-attack UAVs 702a-c (e.g., each having a 30-pound payload capacity for 90-pound total payload capacity), will determine the size, type, and configuration of the net, along the possible drag force and the mass of the counterweights.

It should be appreciated that any number of shapes and configurations of netting could be implemented, such as circular or oval-shaped, polygon-shaped, irregular shaped, etc. In some examples, a plurality of counter-attack UAVs could even deploy a net having a three-dimensional zone of capture, such as the addition of tendrils, or even deploying a spherical net deployed with radial support members, for instance. In this example, at least one "net face" or surface area will always face a particular target aerial vehicle regardless of the rotational position of the net, which increases the chances of capturing the target aerial vehicle.

In the various examples discussed herein, one or more aerial theatre observer UAV(s) can be operated to hover or fly around a monitored area to assist with neutralizing a target aerial vehicle. For instance, high-performance aerial theatre observer UAV(s) can have a variety of sensors and devices discussed herein (e.g., optical cameras, gimbals, etc.) that can "observe" terminal tracking and neutralization of the target aerial vehicle, meaning that the aerial theatre observer UAV(s) can also track, in real-time, the target aerial vehicle and then can communicate collected data to one or more counter-attack UAV(s) and/or to the external aerial vehicle detection system 100. This system assists to provide track target aerial vehicle(s) where tracking may be intermittent or unavailable by the one or more counter-attack UAV(s) and/or to the external aerial vehicle detection system 100 (e.g., due to weather, detection range issues, birds, etc.). Human observers can also received data, such as live video feed, from such aerial theatre observer UAV(s) to observe the success or failure of neutralizing the target aerial vehicle, which can act as a back-up system if the target aerial vehicle avoids neutralization by the counter-attack UAV(s).

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for aerial neutralization of a target aerial vehicle, comprising:
   a plurality of counter-attack unmanned aerial vehicles (UAVs), each comprising a flight control system operable to facilitate flight of the counter-attack UA V to intercept a detected target aerial vehicle; and
   an aerial vehicle capture countermeasure coupled to the plurality of counterattack UAVs, wherein the plurality of counter-attack UAVs are operable in a coordinated manner to capture the target aerial vehicle with the aerial vehicle capture countermeasure,
   wherein the aerial vehicle capture countermeasure comprises a transport position, the transport position comprising a low-drag transport position during flight of the plurality of counter-attack UAVs, and the aerial vehicle capture countermeasure is movable to a deployed capturing position via coordinated flight of the plurality of counter-attack UAVs relative to one another to capture the target aerial vehicle.

2. The system of claim 1, wherein at least one of the counter-attack UAV comprises at least one sensor configured to detect a position of the target aerial vehicle, wherein the flight control system comprises a flight controller operable to control autonomous flight of the counter-attack UAV based on the detected position of the target aerial vehicle.

3. The system of claim 1, wherein at least one counter-attack UAV comprises a communication device communicatively coupled to other communication devices of at least one other counter-attack UA Voran external aerial vehicle detection system to communicate respective positions of at least one counter-attack UAV, thereby facilitating coordinated flight of the plurality of counter-attack UAVs.

4. The system of claim 1, further comprising an external aerial vehicle detection system, the external aerial vehicle detection system comprising at least one detection sensor operable to detect the target aerial vehicle and to provide command data to at least one of the plurality of counter-attack UAVs to facilitate interception of the target aerial vehicle by the plurality of counter-attack UAVs.

5. The system of claim 4, wherein the external aerial vehicle detection system is associated with a ground-based structure to monitor an airspace, wherein the at least one detection sensor comprises a plurality of detection sensors configured to detect a plurality of target aerial vehicles.

6. The system of claim 1, wherein at least one counter-attack UAV comprises at least one camera movably supported by the counter-attack UAV, the at least one camera movable to establish and modify a pointing position, based on the command data received from the external aerial vehicle detection system, to detect and track the target aerial vehicle.

7. The system of claim 1, wherein the aerial vehicle capture countermeasure comprises at least one flexible entangling element configured to disrupt operation of the target aerial vehicle upon the counter-attack UA Vs being in close proximity with the target aerial vehicle.

8. The system of claim 7, wherein the at least one flexible entangling element comprises at least one of a net, filament, monofilament, braided filament, tendril, fiber, string, cord, strand, thread, rope, or wire.

9. The system of claim 1, wherein each counter-attack UAV comprises a force sensor coupled between the counter-attack UA V and the aerial vehicle capture countermeasure, the force sensor configured to sense a force exerted by the aerial vehicle capture countermeasure to facilitate coordinated flight of the plurality of counter-attack UAVs.

10. The system of claim 1, further comprising a base platform supporting the plurality of counter-attack UAVs when in a grounded position, the base platform comprising a retainer device supporting the aerial vehicle capture countermeasure when the plurality of counter-attack UAVs are in the grounded position, wherein, upon detecting the target aerial vehicle, the plurality of counter-attack UAVs are operable to depart from the base platform, thereby withdrawing the aerial vehicle capture countermeasure from the retainer device.

11. The system of claim 1, wherein the aerial vehicle capture countermeasure comprises a net.

12. The system of claim 11, further comprising at least one weighted component coupled proximate a lower area of the net, wherein the plurality of counter-attack UAVs support an upper area of the net such that the at least one weighted device at least partially maintains the net in the deployed position.

13. The system of claim 11, wherein each counter-attack UAV comprises a position sensor and a force sensor, the force sensor coupled to the net and configured to sense a drag force exerted by the net, wherein position data generated from each position sensor is communicated between at least one of another counter-attack UAV or an external aerial vehicle detection system, wherein the position data and the force data are processed to facilitate coordinated flight of the counter-attack UAVs.

14. A system for detecting and neutralizing a target aerial vehicle, the system comprising:
   a plurality of counter-attack unmanned aerial vehicles (UAVs), each comprising a flight body and a flight control system that controls flight of the counter-attack UAV;
   an aerial vehicle capture countermeasure coupled to the plurality of counter-attack UAVs;
   an aerial vehicle detection system comprising at least one detection sensor operable to detect a target aerial vehicle, and to provide command data to at least one counterattack UAV to facilitate interception of the target aerial vehicle by the plurality of counter-attack UAVs;
   wherein, upon interception of the target aerial vehicle, the plurality of counter-attack UAVs are operable in a coordinated manner to capture the detected target aerial vehicle with the aerial vehicle capture countermeasure, wherein the aerial vehicle capture countermeasure comprises a transport position, the transport position comprising a low-drag transport position during flight of the plurality of counter-attack UAVs, and the aerial vehicle capture countermeasure is movable to a deployed capturing position via coordinated flight of the plurality of counter-attack UAVs relative to one another to capture the target aerial vehicle.

15. The system of claim 14, wherein the command data comprises at least one of intercept data, aerial vehicle capture countermeasure deployment command data, target aerial vehicle detection data, counter-attack UAV control data, or a combination thereof.

16. The system of claim 14, wherein the aerial vehicle detection system comprises an on-board aerial vehicle detection system comprising at least one sensor configured to detect a position of the target aerial vehicle, the flight control system comprising a flight controller operable to control autonomous flight of the counter-attack UAV based on the detected position of the target aerial vehicle.

17. The system of claim 14, wherein the aerial vehicle detection system comprises an external aerial vehicle detection system, the external aerial vehicle detection system comprising at least one detection sensor operable to detect the target aerial vehicle and to provide command data to at least one counter-attack UAV to facilitate interception of the target aerial vehicle.

18. The system of claim 17, wherein the external aerial vehicle detection system is associated with a ground-based structure to monitor an airspace, wherein the at least one detection sensor comprises a plurality of detection sensors configured to detect a plurality of target aerial vehicles.

19. The system of claim 14, wherein the flight control system comprises a central processing unit (CPU) and a flight controller, wherein the at least one sensor is operable to detect a position of the target aerial vehicle, the at least one sensor operatively coupled to the CPU for processing data associated with the detected position to track a dynamic flight position of the target aerial vehicle, wherein the flight controller is configured to control autonomous flight of the respective counter-attack UA V to intercept the dynamic flight position of the target aerial vehicle.

20. The system of claim 14, wherein the aerial vehicle capture countermeasure comprises at least one flexible entangling element configured to disrupt operation of the target aerial vehicle upon the plurality of counter-attack UA Vs being in close proximity with the target aerial vehicle.

21. The system of claim 14, wherein the aerial vehicle capture countermeasure comprises a net.

22. A method for aerial neutralization of a target aerial vehicle, comprising:
   detecting a target aerial vehicle;
   operating a plurality of counter-attack unmanned aerial vehicles (UA Vs) to intercept the target aerial vehicle;
   capturing the target aerial vehicle with an aerial vehicle capture countermeasure coupled to the plurality of counter-attack UAVs; and
   operating the aerial vehicle capture countermeasure in a transport configuration, the transport position comprising a low-drag transport position during flight of the plurality of counter-attack UAVs, and operating the counter-attack UAVs to move relative to one another to move the aerial vehicle capture countermeasure to a deployed configuration to capture the target aerial vehicle.

23. The method of claim 22, wherein detecting the target aerial vehicle further comprises tracking a dynamic flight position with an aerial vehicle detection system, wherein the aerial vehicle detection system comprises at least one of a detection sensor on-board the counter-attack UAV or a detection sensor remotely located from the counterattack UAV.

24. The method of claim 22, further comprising communicating position data between at least one of another counter-attack UAV or an external aerial vehicle detection system to facilitate coordinated flight and coordinated neutralization of the target aerial vehicle.

25. The method of claim 22, further comprising deploying the aerial vehicle capture countermeasure by coordinating flight of the plurality of counter-attack UAVs.

26. The method of claim 22, wherein detecting the target aerial vehicle comprises autonomously detecting the target aerial vehicle and autonomously tracking the target aerial vehicle.

27. The method of claim 22, further comprising establishing a pointing position of a camera of at least one counter-attack UAV to track the target aerial vehicle, the pointing position based on command data received from the aerial vehicle detection system.

28. The method of claim 22, further comprising deploying the plurality of counter-attack UAVs from a base platform supporting the plurality of counterattack UAVs when in a grounded position, the base platform comprising a retainer device supporting the aerial vehicle capture countermeasure when the plurality of counter-attack UAVs are in the grounded position, wherein the plurality of counter-attack UAVs withdraw the aerial vehicle capture countermeasure from the retainer device upon deployment of the plurality of counter-attack UAVs.

29. The method of claim 22, further comprising moving a base station to a predetermined location relative to a monitored airspace, and supporting the plurality of counter-attack UAV s about a platform of the base station, and bundling the aerial vehicle capture countermeasure about a retainer device of the base station.

30. The method of claim 22, wherein the aerial vehicle capture countermeasure comprises a net, and wherein operating the aerial vehicle capture countermeasure in the transport position comprises operating the net in a bundled configuration during flight of the plurality of counter-attack UAVs.

31. The method of claim 22, further comprising releasing the aerial vehicle countermeasure and the captured target aerial vehicle from the counter-attack UAVs at a particular location.

32. The method of claim 22, wherein detecting the target aerial vehicle further comprises operating an optical sensor and a radar sensor each supported by the counterattack UAV to detect a position of the target aerial vehicle.

33. The method of claim 22, wherein detecting the target aerial vehicle further comprises operating a plurality of detection sensors associated with a ground structure to generate position data associated with the target aerial vehicle, the method further comprising continuously communicating the position data to the counter-attack UAV.

34. The method of claim 22, wherein detecting the target aerial vehicle further comprises operating a plurality of detection sensors to generate position data associated with the target aerial vehicle, the method further comprising eliminating position data associated with one or more detection sensors based on a credibility hierarchy associated with the plurality of detection sensors.

35. A tangible and non-transitory computer readable medium comprising one or more computer software modules configured to direct one or more processors to:

receive data generated by one or more detection sensors, the data associated with a target aerial vehicle;

determine a position of the target aerial vehicle based on the received data; and communicate command data associated with the determined position to a plurality of counter-attack unmanned aerial vehicles (UAVs), wherein the command data comprises instructions for the counter-attack UAVs to fly in a swarm to transport an aerial vehicle capture countermeasure in a transport configuration to the determined position, the transport position comprising a low-drag transport position, and to move the aerial vehicle capture countermeasure to a deployed position via coordinated flight of the counter attack UAVs relative to one another to capture the target aerial vehicle.

36. The non-transitory computer readable medium of claim 35, wherein the plurality of counter-attack UAVs fly autonomously by communicating their respective positions to each other, and wherein respective flight controllers of the plurality of counter-attack UAVs cause the plurality of counter-attack UAVs to fly to move the aerial vehicle capture countermeasure to the deployed position.

37. The non-transitory computer readable medium of claim 35, wherein the plurality of counter-attack UAVs fly autonomously based at least in part on information received from an on-board force sensor which senses an orientation and a pulling force of the aerial vehicle capture countermeasure relative to the plurality of counter-attack UAVs, respectively.

* * * * *